US008405886B2

United States Patent
Kurigata

(10) Patent No.: US 8,405,886 B2
(45) Date of Patent: Mar. 26, 2013

(54) PIXEL INTERPOLATION APPARATUS, METHOD FOR PIXEL INTERPOLATION, AND IMAGE READING APPARATUS USING THE SAME

(75) Inventor: Yuhei Kurigata, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 343 days.

(21) Appl. No.: 12/843,978

(22) Filed: Jul. 27, 2010

(65) Prior Publication Data

US 2011/0038018 A1 Feb. 17, 2011

(30) Foreign Application Priority Data

Aug. 12, 2009 (JP) ................. 2009-187419

(51) Int. Cl.
*H04N 1/04* (2006.01)
*G06K 9/32* (2006.01)
*G06K 9/48* (2006.01)

(52) U.S. Cl. .................... 358/474; 382/300; 382/199

(58) Field of Classification Search ................ None
See application file for complete search history.

(56) References Cited

U.S. PATENT DOCUMENTS

| 4,288,821 | A | * | 9/1981 | Lavallee et al. ............... 358/3.07 |
| 6,091,862 | A | * | 7/2000 | Okisu ................................ 382/300 |
| 6,753,910 | B1 | * | 6/2004 | Ogata et al. ..................... 348/235 |
| 2004/0126037 | A1 | * | 7/2004 | Kim et al. ......................... 382/300 |
| 2010/0008580 | A1 | * | 1/2010 | Mizuno ........................... 382/176 |

FOREIGN PATENT DOCUMENTS

| JP | 2004-274573 A | 9/2004 |
| JP | 2005-141611 A | 6/2005 |
| JP | 2008-136988 A | 6/2008 |

OTHER PUBLICATIONS

Notice of Reasons for Refusal issued May 9, 2011, in corresponding Japanese Patent Application No. 2009-187419, and an English translation thereof.

* cited by examiner

*Primary Examiner* — Marivelisse Santiago Cordero
*Assistant Examiner* — Brett Gardner
(74) *Attorney, Agent, or Firm* — Buchanan Ingersoll & Rooney PC

(57) ABSTRACT

An embodiment has: weighting interpolation section for obtaining a pixel value for a missing pixel by a one-dimensional weighting interpolating method, using pixels in the vicinity of the missing pixel as reference pixels, and for generating a primarily interpolated image signal including the interpolated pixel value in place; frequency decomposition section for decomposing the primarily interpolated image signal into frequency components; halftone dot extraction sections for obtaining a halftone dot degree indicating a degree for the vicinity of the missing pixel to be in the halftone dot region, by using higher ones of these frequency components; correction value calculation section for calculating a correction value for the missing pixel, by using lower ones of these frequency components; and correction section for correcting the pixel value of the missing pixel in the primarily interpolated image signal using the correction value depending on the halftone dot degree.

19 Claims, 21 Drawing Sheets

INPUT IMAGE SIGNAL 43
(READ-IN IMAGE DATA)

IMAGE DATA WITH
THE OBJECTIVE PIXEL J
INSERTED IN THE
POSITION OF THE
MISSING PIXEL

FILTER CALCULATION ×

INTERPOLATION
COEFFICIENTS
(FILTER FACTORS)

dout (INTERPOLATION DATA FOR
THE MISSING PIXEL DETERMINED)

| CORRESPONDING IMAGE COORDINATES | FIRST FREQUENCY DECOMPOSITION SECTION | | SECOND FREQUENCY DECOMPOSITION SECTION | |
|---|---|---|---|---|
| | HPF | LPF | HPF | LPF |
| -3 | | | | 0.125 |
| -2 | | | | 0 |
| -1 | | 0.125 | -2.0 | 0.375 |
| 0 | -2.0 | 0.375 | 0 | 0 |
| +1 | 2.0 | 0.375 | 2.0 | 0.375 |
| +2 | | 0.125 | | 0 |
| +3 | | | | 0.125 |

FIG. 13a $$\begin{bmatrix} 1/64 & 3/64 & 3/64 & 1/64 \\ 3/64 & 9/64 & 9/64 & 3/64 \\ 3/64 & 9/64 & 9/64 & 3/64 \\ 1/64 & 3/64 & 3/64 & 1/64 \end{bmatrix} \times \begin{bmatrix} d(-1,-1) & d(0,-1) & d(1,-1) & d(2,-1) \\ d(-1,0) & d(0,0) & d(1,0) & d(2,0) \\ d(-1,1) & d(0,1) & d(1,1) & d(2,1) \\ d(-1,2) & d(0,2) & d(1,2) & d(2,2) \end{bmatrix} = s1m(0,0)$$

FIG. 13b $$\begin{bmatrix} 1/64 & 3/64 & 3/64 & 1/64 \\ 3/64 & 9/64 & 9/64 & 3/64 \\ 3/64 & 9/64 & 9/64 & 3/64 \\ 1/64 & 3/64 & 3/64 & 1/64 \end{bmatrix} \times \begin{bmatrix} d(-1,-1) & d(0,-1)+dpr & d(1,-1) & d(2,-1) \\ d(-1,0) & d(0,0)+dpr & d(1,0) & d(2,0) \\ d(-1,1) & d(0,1)+dpr & d(1,1) & d(2,1) \\ d(-1,2) & d(0,2)+dpr & d(1,2) & d(2,2) \end{bmatrix} = s1m(0,0)+(3/8)dpr$$

FIG. 19

| RANGE OF NORMALIZED HIGH FREQUENCY COMPONENT NW | CORRECTION VALUE TO SELECT |
|---|---|
| NW > RTH | FIRST CORRECTION VALUE |
| NW ≤ RTH | SECOND CORRECTION VALUE |

110

IMAGE DATA WITH THE OBJECTIVE PIXEL J INSERTED IN THE POSITION OF THE MISSING PIXEL

SECOND INTERPOLATION COEFFICIENTS 142

FIRST INTERPOLATION COEFFICIENTS 141

PIXEL INTERPOLATION APPARATUS, METHOD FOR PIXEL INTERPOLATION, AND IMAGE READING APPARATUS USING THE SAME

This application is based on Japanese Patent Application No. 2009-187419 filed on Aug. 12, 2009, in Japanese Patent Office, the entire content of which is hereby incorporated by reference.

TECHNICAL HELD

The present invention relates to a pixel interpolation apparatus to interpolate a missing pixel, a method for pixel interpolation, and an image reading apparatus.

BACKGROUND

Contact type linear image sensor (Contact Image Sensor; hereinafter, referred to as CIS) 12 utilized in an image reading apparatus to optically read an original image has a constitution in which plural number of sensor chips 12a are connected one after another along the horizontal scanning direction. In such a constitution, since it is difficult to precisely make the inter pixel distance of length Lb corresponding to one pixel (approximately 42.3 μm in the case of 600 dpi) at the connecting portion between sensor chips 12a, many contact type line sensors adopt interval La corresponding to approximately two pixels (approximately 84.6 μm in the case of 600 dpi) at the connecting portion, thus allowing one missing pixel K at said connecting portion.

When an output signal of such a contact type linear image sensor is utilized without paying any attention to the missing pixel, a step will be generated in a line image at the connecting portion having a missing pixel, or a stripe noise will be generated in a halftone dot having a periodicity, resulting in deterioration of image quality. Therefore, in order to make the stripes less visible, there is often used a filter which interpolates a missing pixel by employing, as reference pixels, the peripheral pixels along the one dimensional direction including a missing pixel (for example, the horizontal scanning direction (the line direction of a contact type linear image sensor)).

Such interpolation is effective for a line image and a natural image; however, unnatural stripes will be generated in a halftone dot image having a fine periodical pattern.

As a method to make interpolation error small in the case of interpolating an image such as a fine halftone dot image having high periodicity, JP-A 2005-141611 (hereinafter, JP-A refers to Japanese Patent Publication Open to Public Inspection No.) discloses an interpolating method, in which data for interpolation of a missing pixel is determined such that the average value of a set of plural pixels containing a missing pixel is made to be equal to the average value of a set of plural pixels not containing a missing pixel. In this document, as an example to make those two average values coincide to each other, disclosed is a method in which the total values of the pixels, except a missing pixel, of a set of N pixels containing the missing pixel and the total values of a set of N pixels not containing a missing pixel are determined, and a difference thereof is made to be interpolation data for the missing pixel.

In an interpolation method disclosed in JP-A 2005-141611, since interpolation data for a missing pixel are estimated such that an average value of peripheral pixels not containing the missing pixel is equal to an average values of peripheral pixels containing a missing pixel, reference pixels utilized to determine those average values are limited in the one dimensional direction (the line direction of a contact type line image sensor).

In particular, when two or more missing pixels having an unknown value are included in the range of peripheral pixels containing these missing pixels, intensities of those missing pixels cannot be separately determined only under the condition that an average value of the region containing missing pixels is equal to an average value of the region not containing the missing pixels, thus, the plural missing pixels are only interpolated to have an identical intensity, which means the most appropriate interpolation is impossible. Therefore, in an interpolation method of JP-A 2005-141611, reference pixels to be used to determine the average value are limited in one dimensional direction. That is, suitable interpolation corresponding to periodicity of a two dimensional halftone dot image. Further, when a reference region is widened in the one dimensional direction, reference pixels become distant from a missing pixel, and the relevance to the missing pixel gets smaller.

SUMMARY

In view of forgoing, an embodiment reflecting one aspect of the present invention is a pixel interpolation apparatus, comprising:

a weighting interpolation section configured to calculate a pixel value for a missing pixel, as an interpolated pixel value, by a weighting interpolation method using, as reference pixels, pixels located in a neighborhood of the missing pixel in an input image including the missing pixel, and configured to generate a primarily interpolated image signal in which the interpolated pixel value is inserted in a position, in the input image, corresponding to the missing pixel;

a frequency decomposition section configured to decompose the primarily interpolated image signal generated by the weighting interpolation section into a plurality of frequency components of a plurality of frequency regions;

a halftone dot extraction section configured to calculate a halftone dot degree indicating a degree of probability that a vicinity of the missing dot is located in a halftone dot region, by using a higher frequency component of the plurality of frequency components obtained by the frequency decomposition section;

a correction value calculation section configured to calculate a correction value for the interpolated pixel value, by using a low frequency component of the plurality of frequency components; and a correction section configured to correct, according to the halftone dot degree, the interpolated pixel value for the missing pixel of the primarily interpolated image signal so as to generate a corrected image signal, and configured to output the corrected image signal as a result of interpolation.

In view of another aspect of the present invention, another embodiment is the above-mentioned pixel interpolation apparatus, wherein, as an operation of correcting the interpolated pixel vale for the missing pixel using the correction value according to the halftone dot degree, the correction section adds the correction value to the interpolated pixel value for the missing pixel according to the halftone dot degree.

In view of another aspect of the present invention, another embodiment is the above-mentioned pixel interpolation apparatus, wherein the correction value calculation section calculates the correction value based on a difference between a low frequency component, at a position of the missing pixel, of the plurality of frequency components obtained by the frequency decomposition performed by the frequency decomposition section, and a low frequency component, at a position of the reference pixels in the neighborhood of the missing pixel, of the plurality of frequency components of the plurality of frequency components.

In view of another aspect of the present invention, another embodiment is the above-mentioned pixel interpolation apparatus, wherein the correction value calculation section calculates the correction value for each of low frequency components which are of the plurality of frequency components output from the frequency decomposition section and which include the lowest frequency component and have different frequency region from each other, and from the thus calculated correction values one correction value is selected depending on a frequency component in a vicinity of the missing pixel and is output as a correction value for the missing pixel.

In view of another aspect of the present invention, another embodiment is the above-mentioned pixel interpolation apparatus, wherein the halftone dot extraction section includes:

a halftone dot coefficient calculation section configured to calculate a halftone dot coefficient for each of the plurality of reference pixels in the neighborhood of the missing pixel, using the high frequency component, wherein the halftone dot coefficient indicates a degree of probability that the each of the plurality of reference pixels is located in the halftone dot region; and a halftone dot coefficient selection section configured to output, as the halftone dot degree, a minimum value of the plurality of halftone dot coefficients calculated in the halftone dot calculation section.

In view of another aspect of the present invention, another embodiment is the above-mentioned pixel interpolation apparatus, wherein the input image is made of pixels arranged in a matrix, and the edge extraction section averages the frequency components which are of the plurality of frequency components output from the frequency decomposition section and do not include the lowest frequency component, in each of a row direction and a column direction of the matrix in a region having a predetermined size, thereby obtaining averages, and then calculates a root mean square of the obtained averages to output the mot mean square as the edge extraction value.

BRIEF DESCRIPTION OF THE DRAWINGS

FIG. 9 is an explanation drawing to show an example of filter factors of a high pass filter and a low pass filter in a frequency decomposition section shown in FIG. 8;

FIGS. 13a and 13b are a calculation formula to determine a low frequency component of a missing pixel, before addition of correction value, based on the filter factors in FIG. 12, and a calculation formula to determine a low frequency component of the missing pixel, after addition of correction value, based on the filter factors in FIG. 12;

FIG. 19 is an explanation drawing to show a selection table representing selection conditions for a correction value selection section to select a correction value;

DETAILED DESCRIPTION OF THE PREFERRED EMBODIMENT

In the following, various embodiments of this invention will be explained in reference to the drawings.

First Embodiment

Figure 1:
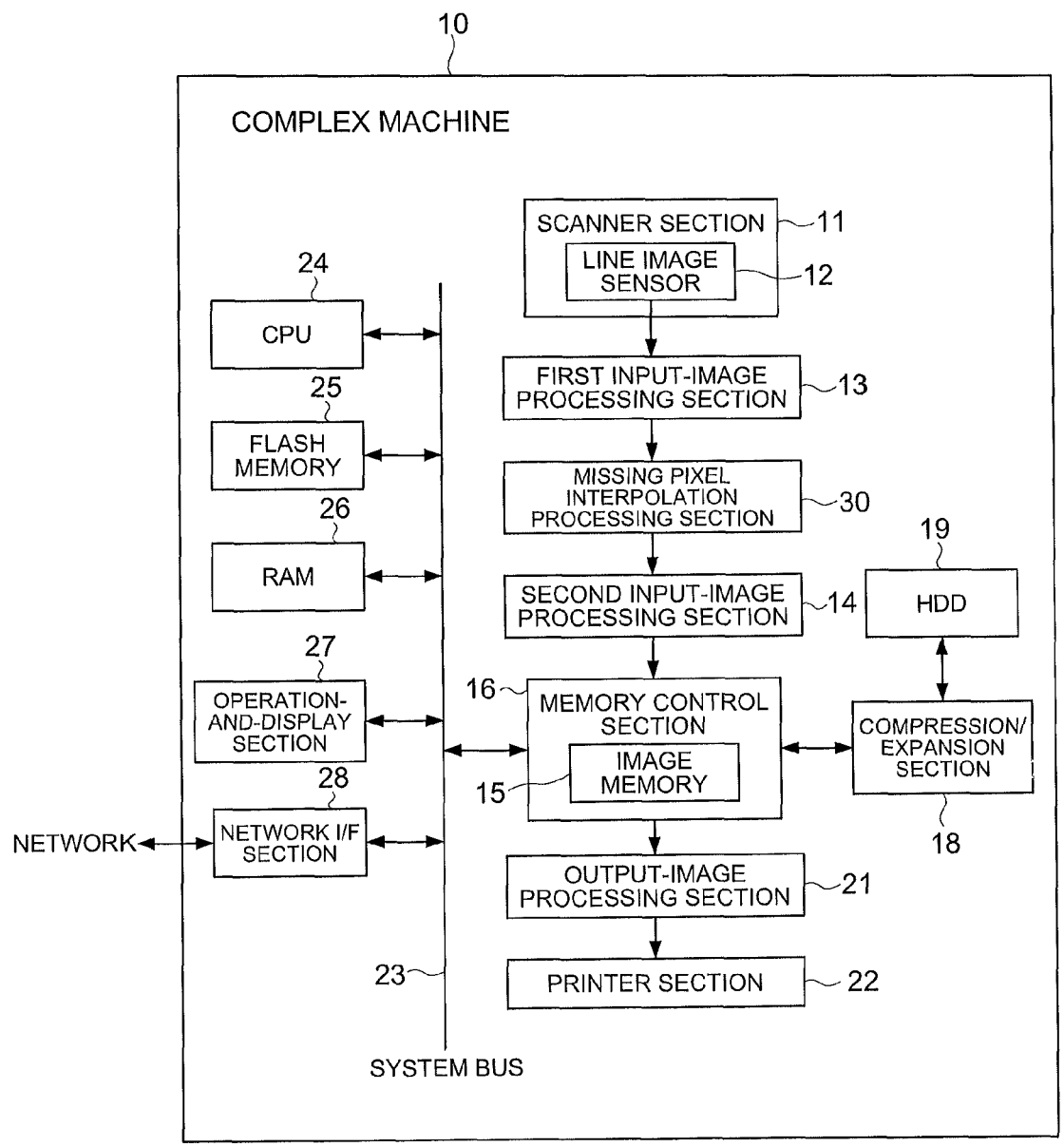
FIG. 1 is a block diagram to show an outline constitution of a digital complex machine in which an image reading apparatus according to the first embodiment of this invention is installed.

FIG. 1 is a block diagram to show an schematic constitution of a digital complex machine in which an image reading apparatus according to a first embodiment of this invention is installed. Digital complex machine 10 is an apparatus provided with a function to form a reproduction of an image on recording paper to and print it out, which image has been obtained by optically reading an original document, a scanning function to produce or store as a file the original image having been read, and a printing function to form and produce an image on a paper based on printing data received from an external terminal.

Digital complex machine 10 is equipped with scanner section 11 to obtain image data by optically reading an original document, the first input-image processing section 13 to read in an analogue image signal produced with a contact type line image sensor 12 which is provided in scanner section 11, and to subject them to an A/D (analogue to digital) conversion process and shading correction and the like; missing pixel interpolation processing section 30 to interpolate a missing pixel with respect to image data produced by the first input-image processing section 13; the second input-image processing section 14 to subject the interpolated image data produced by missing pixel interpolation processing section 30 to image processing such as gamma correction; Memory control section 16 to control reading and writing of data from and in image memory 15; compression/expansion device 18 to perform compression and expansion of image data; hard disc drive (HDD) 19 to store image data compressed by compression/expansion device 18 or non-compressed image data; output-image processing section 21 to subject image data to various image processing for printing out; and printer section 22 to form an image on recording paper and print it out based on image data produced by output-image processing section 21.

Further, digital complex machine 10 is equipped with system bus 23 constituted by a PCI (Peripheral Component Interconnect) bus and the like, which system bus 23 is connected with CPU (Central Processing Unit) 24 to function to totally control said digital complex machine 10; flash memory 25 to memorize programs to be performed by CPU 24 and various data in a rewritable and nonvolatile manner; RAM (Random Access Memory) 26 utilized as a work memory and the like to temporarily store various data at the time of execution of programs by CPU 24; operation-and-display section 27; network I/F section 28; and Memory control section 16 described above.

Operation-and-display section 27 is constituted by a liquid crystal display, the surface of which is equipped with a touch panel, and various operation switches; and has functions to display for users various instruction and status, and to receive various operations from the users.

Network I/F section 28 is connected with networks such as a LAN (Local Area Network) and functions to transmit data to and receive data from an external apparatus.

Scanner section 11 conveys an original document to be read with an automatic original conveying device, which is not shown in the drawing, and two-dimensionally reads the original image by a so-called flow-scan reading method by use of contact type line sensor 12 arranged in the conveying path.

Figure 2:
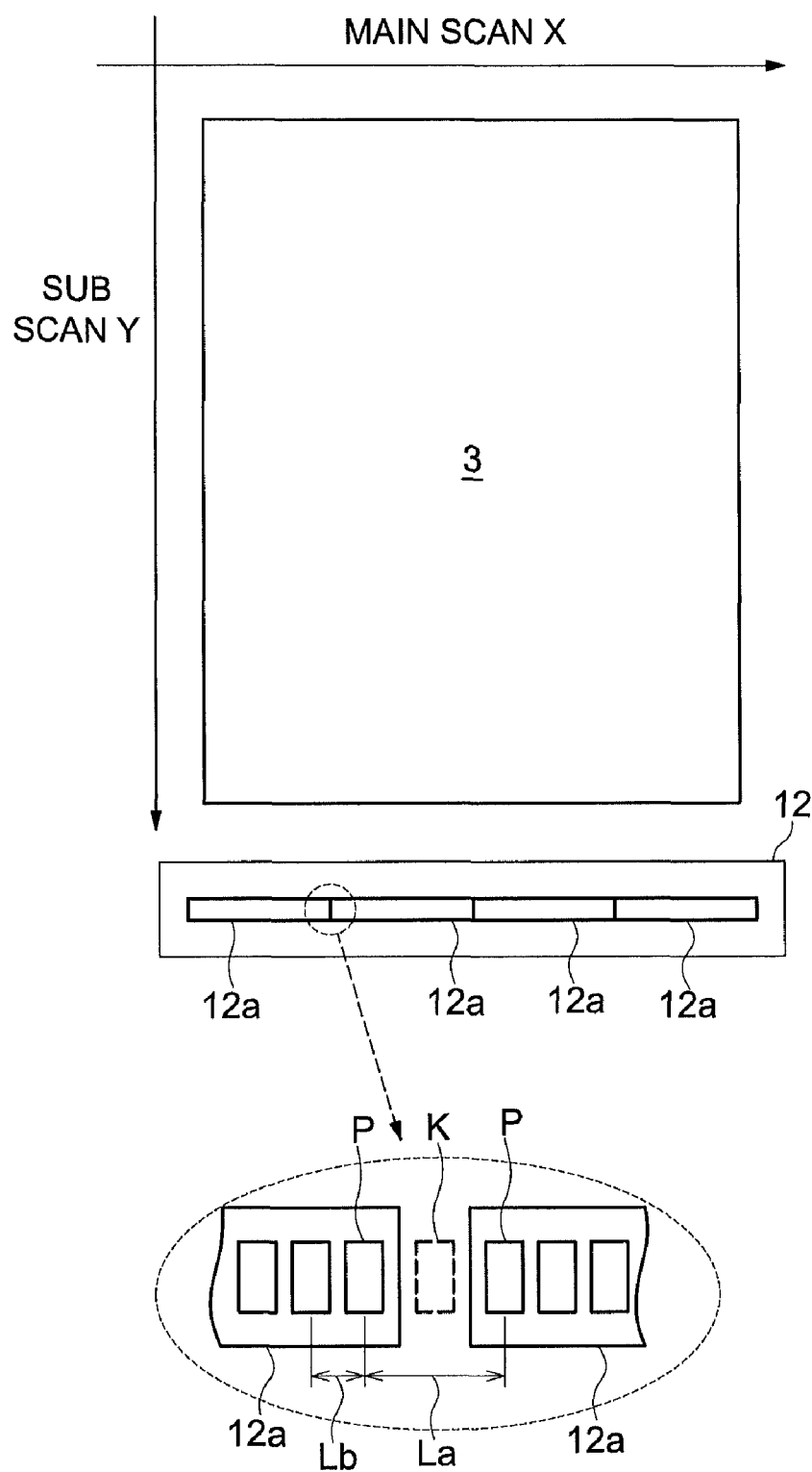
FIG. 2 is an explanation drawing to show the relationship of the horizontal scanning direction and the vertical scanning direction with respect to a line image sensor, and a constitution of the line image sensor comprising plural sensor chips.

That is, as shown in FIG. 2, line image sensor 12 has a reading region corresponding to one line in the horizontal scanning direction (X), the conveying direction of original document 3 is set in the vertical scanning direction (Y) perpendicular to the horizontal scanning direction (X), and original document 3 is read as a two-dimensional image by repeatedly performing reading operation line by line with line image sensor 12 while original document 3 passes through the light receiving part of line image sensor 12. Herein, original document 3 and line image sensor 12 only have to be shifted relatively to each other in the sub scanning direction, therefore the constitution may be made such that line image sensor 12 may be shifted in the sub scanning direction with original document 3 being placed on a platen glass.

Line image sensor 12 is constituted by arranging plural number of sensor chips 12a in series along the horizontal scanning direction, in which sensor chip 12a is equipped with a reading region corresponding to plural pixels aligned in series along the horizontal scanning direction. At the boundary between the sensor chips 12a, interval La between reading pixels P on the both sides adjacent to the boundary is longer (approximately 2 times of Lb) than pixel pitch Lb of each sensor chip 12a, one missing pixel (this missing pixel is referred to as missing pixel K) is generated at this boundary portion. In this embodiment, line image sensor 12 has a resolution of 600 dpi to so as to have total 7488 pixels (312 pixels×24 sensor chips), and 23 missing pixels K are generated in one line. Lb is 42.3 μm and La is 84.6 μm.

Returning to FIG. 1, explanation will be continued. Memory control section 16 is provided with a function to control transmitting and receiving of data among second input-image processing section 14, image memory 15, compression/expansion device 18, output-image processing section 21 and system bus 23. In detail, included are a function to read in image data produced by second input-image processing section 14, a function to control writing and reading of data on image memory 15 by giving an address signal and a timing signal to image memory 15, a function to transmit data to and receive data from compression/expansion device 18, a function to transmit image data memorized on image memory 15 to output-image processing section 21, and a function to transmit and receive image data and control data with system bus 23.

Output-image processing section 21 functions to provide image processing with gamma conversion, frequency conversion, PWM (Pulse Width Modulation) conversion on the image data from Memory control section 16, and the like and to perform timing control of sending out the image data to printer section 22 one after another in synchronism with a timing signal from printer section 22.

Printer section 22 forms and prints an image, corresponding to the image data transmitted from output-image processing section 21, on recording paper by means of an electrophotographic process. Printer section 22 is provided with a conveying device of recording paper; a photoconductor drum; a charging device; a laser unit; a developing device; a transfer separation device; a cleaning device and a fixing device. In other words, printer section 22 is constituted as a so-called laser printer. Printer section 22 may be constituted by a printer of other type.

In digital complex machine 10, for example, a reading operation and an output operation are performed when a copy job for copying an original document is executed. In a reading operation, an original document is read in by scanner section 11, shading correction on the image data obtained by reading is performed by first input-image processing section 15, interpolation of missing pixel K is performed by missing pixel interpolation processing section 30, and the interpolated image data is processed by second input-image processing section 14 to be stored in image memory 15 or in hard disc device 19 after having been compressed by compression/expansion device 18 or without compression.

In the output operation, the stored image data is read out in order from image memory 15 or hard disc device 19, the image data having been processed by output-image processing section 21 is transmitted to printer section 22 as they are in the case of uncompressed data or after expansion by compression/expansion device 18 in the case of compressed data, and said printer section 22 forms and printing out an image corresponding to said image data on recording paper.

Figure 3:
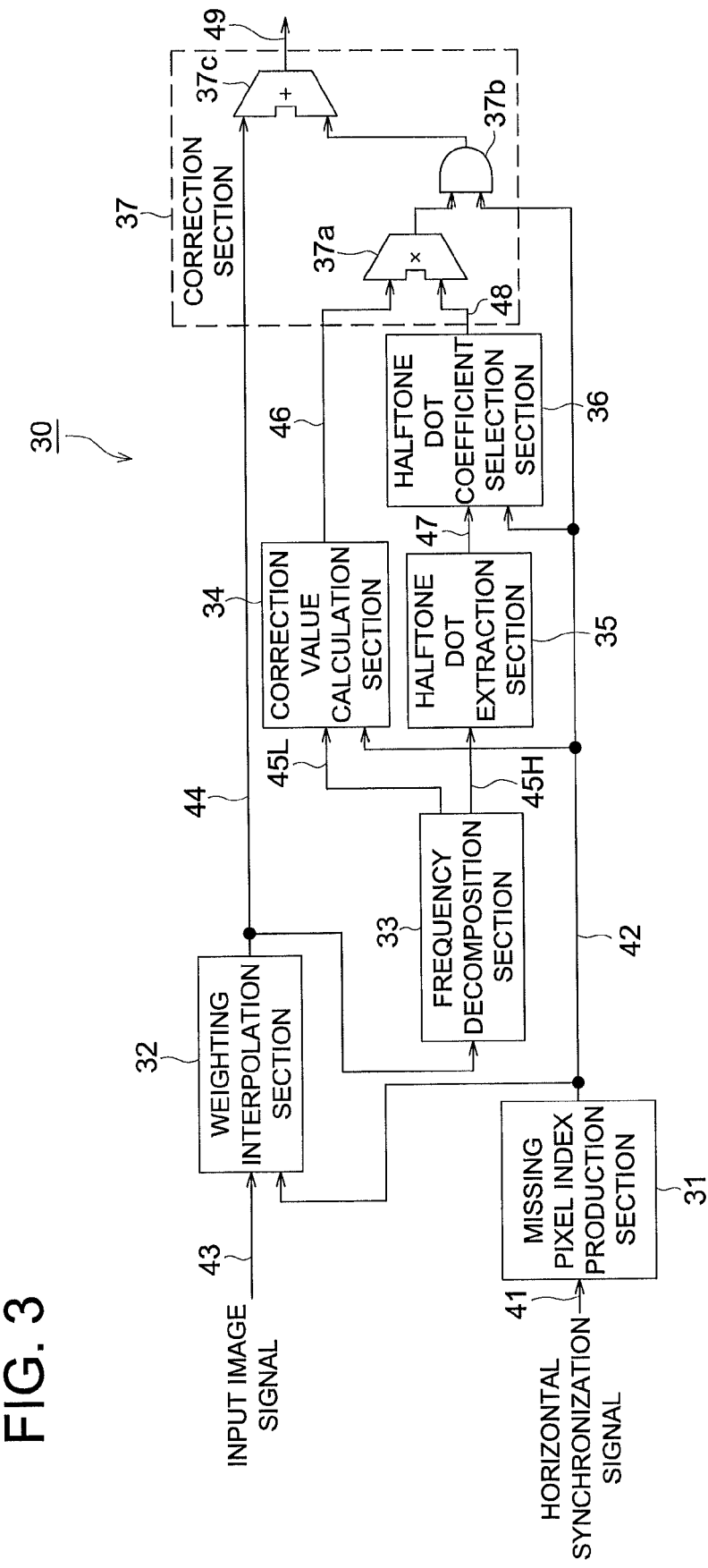
FIG. 3 is a block diagram to show a basic constitution of an image interpolation processing section.

FIG. 3 shows a basic constitution of missing pixel interpolation processing section 30 to interpolate missing pixels contained in an image having been read by line image sensor 12. Missing pixel interpolation processing section 30 is constituted by missing pixel index generation section 31; weighting interpolation section 32; frequency decomposition section 33; correction value calculation section 34; halftone dot extraction section 35; halftone dot coefficient selection section 36; and correction section 37.

Missing pixel index generation section 31 outputs missing pixel index signal 42 which indicates the pixel position of a missing pixel. In missing pixel index generation section 31, a clock signal to indicate the input cycle in a pixel unit, which is not shown in the drawing, and horizontal synchronization signal 41 to indicate a standard position (such as the position of a top pixel) for each line of image data which is read in order in synchronism with this clock signal are input. Missing pixel index generation section 31 counts the pixel number from the top pixel of one line based on the horizontal synchronization signal 41 as a standard, and outputs missing pixel index signal 42 which will be active only at the predetermined pixel positions of the missing pixels.

In weighting interpolation section 32, input image signal (image data having been read in order in synchronism with horizontal synchronization signal 41 and a clock signal from the top pixel) 43 obtained by reading with line image sensor 12 of scanner section 11, and missing pixel index signal 42 are read in. Weighting interpolation section 32 interpolates a missing pixel by a weighting interpolation method in reference to peripheral pixels of the missing pixel (for example, left and right pixels adjacent to the missing pixel and in the same line along the main scanning direction as the missing pixel) as reference pixels. In other words, the pixel value (a weighted interpolation value) of a missing pixel is determined depending on the left and right reference pixels, and primarily interpolated image signal 44, in which image data corresponding to one pixel having said pixel value is assigned to the position of said missing pixel in input image signal 43, is generated and transmitted.

Frequency decomposition section 33 reads in primarily interpolated image signal 44 from weighting interpolation section 32 and decomposes this signal into frequency components of plural number of frequency regions. In FIG. 3, said signal is decomposed into high frequency component 45H and low frequency component 45L.

Correction value calculation section 34 reads in missing pixel index signal 42 and low frequency component 45L transmitted from frequency decomposition section 33 to calculate, based on low frequency component 45L, correction value 46 for the pixel value of the missing pixel inserted by weighting interpolation section 32. Correction value calculation section 34 calculates an average pixel value as a correction value for a relatively wide region around the missing pixel by utilizing a low frequency component.

Halftone dot extraction section 35 reads in high frequency component 45H produced by frequency decomposition section 33 to obtain halftone dot coefficient 47 which shows a degree for the region, where a pixel related to this high frequency component 45H, to be in the halftone dot region. In this description, "a degree for the region to be in the halftone dot region" means the degree of the probability that the region is in the halftone dot region. Halftone dot extraction section 35 derives plural number of halftone dot coefficients 47 for one objective pixel based on different reference pixels. In this embodiment, halftone dot coefficient 47 is a numerical value within a range of 0-1, and as the region is a halftone dot region at higher degree, the value is closer to 1. Herein, halftone dot refers to an arrangement of dots or individual dots utilized for expression of density in printed matter. The density is expressed depending on an interval of pixels or an arrangement pattern of predetermined number of pixels.

Halftone dot coefficient selection section 36 reads in missing pixel index signal 42 and halftone dot coefficients 47 determined in halftone dot extraction section 35. Halftone dot coefficient selection section 36 selects the most suitable one among plural number of halftone dot coefficients 47 transmitted from halftone dot extraction section 35 with respect to a missing pixel, and output the selected halftone dot coefficient as correction coefficient 48.

Correction section 37 reads in primarily interpolated image signal 44 from weighting interpolation section 32, correction values 46 from correction value calculation section 34, and correction coefficient 48 from halftone dot coefficient selection section 36. Further, missing pixel index signal 42 is also read in. Correction section 37 outputs a signal which is a pixel value of the missing pixel in primarily interpolated image signal 44 corrected by correction value 46 at a ratio corresponding to correction coefficient 48, and outputs primarily interpolated image signal 44 as output image signal 49, which is an interpolation result. In detail, with respect to a missing pixel, a multiplication of correction value 46 and correction value 48 is added to a pixel value of the missing pixel in primarily interpolated image signal 44.

Correction coefficient 48 is closer to "1" when a missing pixel exists in a region more likely to be a halftone dot region, thus, the ratio of a pixel value of a missing pixel in primarily interpolated image signal 44 having been corrected by correction value 46 is greater when a missing pixel exists in a region the more likely to be a halftone dot region. On the contrary, since correction coefficient 48 is closer to "0" when a missing pixel exists in a region more likely to be a non-halftone dot region, the ratio of a pixel value of a missing pixel in primarily interpolated image signal 44 having been corrected by correction value 46 is smaller. In this manner, missing pixel interpolation processing section 30 corrects, by a correction value depending on the degree of a region where the missing pixel exists being a halftone dot region, the pixel value of the missing pixel determined by the first interpolation (the weighting interpolation) in weighting interpolation section 32.

When a missing pixel exists in a halftone dot region having a high line number, for example, the halftone dot pattern may have a pattern where the position of the missing pixel is a white pixel and the pixels on its both sides are black pixels. In this case, since the pixels on the both sides of the missing pixel are black pixels, the missing pixel is interpolated as a black pixel when using the weighting interpolation. Whereby, an error between the actual color (white) and the interpolation value (black) is large. Therefore, when a missing pixel is in a halftone dot region, particularly in a halftone dot region having a high line number, a correction value obtained by weighting interpolation will be corrected.

Herein, since a halftone dot region shows halftone with plural pixels, the value interpolated by weighting interpolation will be corrected such that the density of a region containing the missing pixel is equal to the density of a peripheral region of the missing pixel, where the areas of the both region are wide to a certain extent. In this way, the missing pixel is interpolated providing a natural connection.

Figure 4:
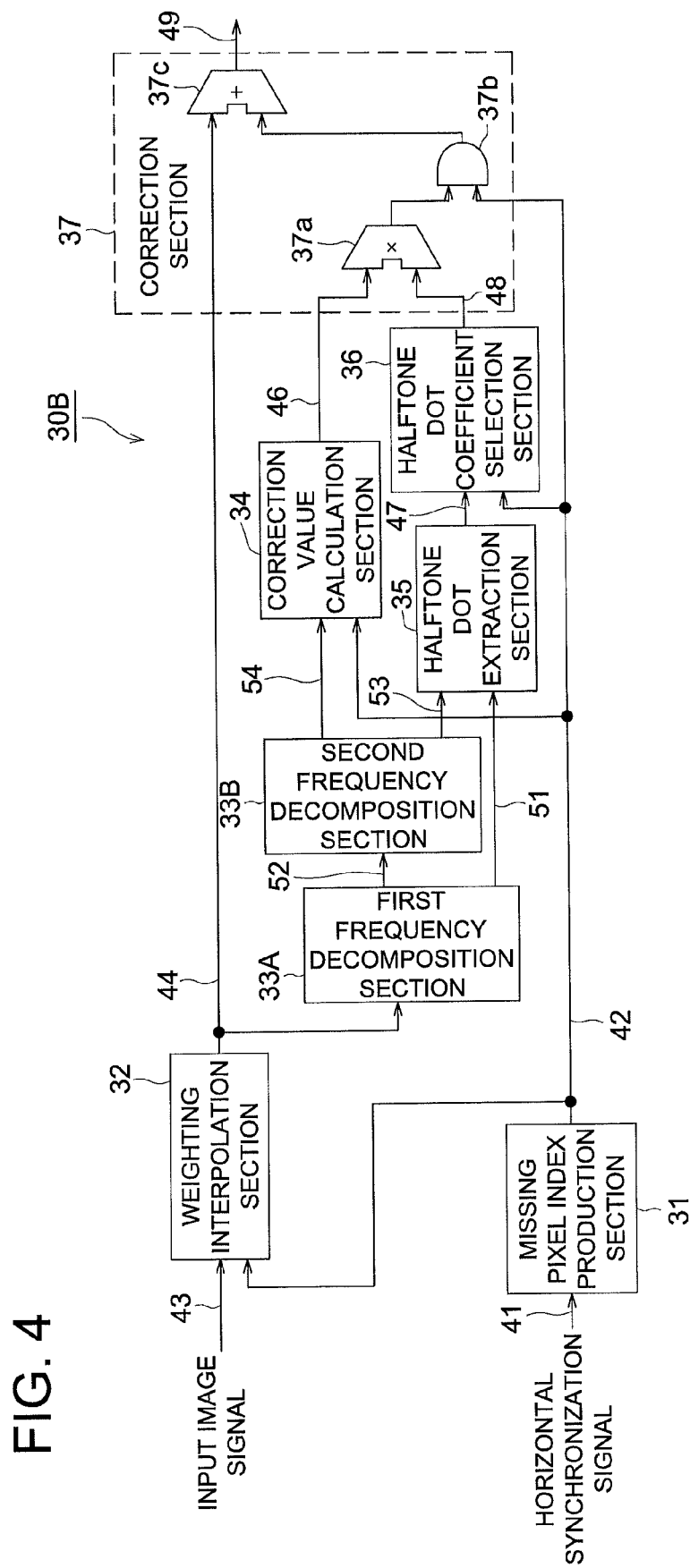
FIG. 4 is a block diagram to show a missing pixel interpolation processing section to perform two-step frequency decomposition.

In the following, operations of each section of missing pixel interpolation processing section 30 will be explained based on missing pixel interpolation processing section 30B having the constitution in FIG. 4. In FIG. 4, identical symbols are assigned to the sections identical with those in FIG. 3. In missing pixel interpolation processing section 30B, frequency decomposition is performed in two steps. The other aspects are identical with missing pixel interpolation processing section 30 shown in FIG. 3.

In detail, missing pixel interpolation processing section 30B is provided with first frequency decomposition section 33A and second frequency decomposition section 33B as frequency decomposition section 33. First frequency decomposition section 33A decomposes primarily interpolated image signal 44 into first high frequency component 51 and first low frequency component 52, and second frequency decomposition section 33B outputs second high frequency component 53 and second low frequency component 54 in which first low frequency component 52 produced by first frequency decomposition section 33A is further decomposed into high and low frequency components. Second low frequency component 54 is read in by correction value calculation section 34 as low frequency component 45L in FIG. 3, and first high frequency component 51 and second high frequency component 53 are read in by halftone dot extraction section 35 as high frequency component 45H in FIG. 3.

<Weighting Interpolation Section 32>

Figure 5A:
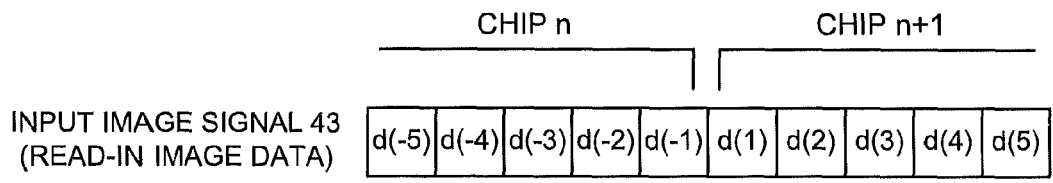
FIGS. 5a and 5b are explanation drawings to show content of process for a missing pixel interpolation process utilizing a one dimensional filter performed by a weighting interpolation section.
Figure 5B:
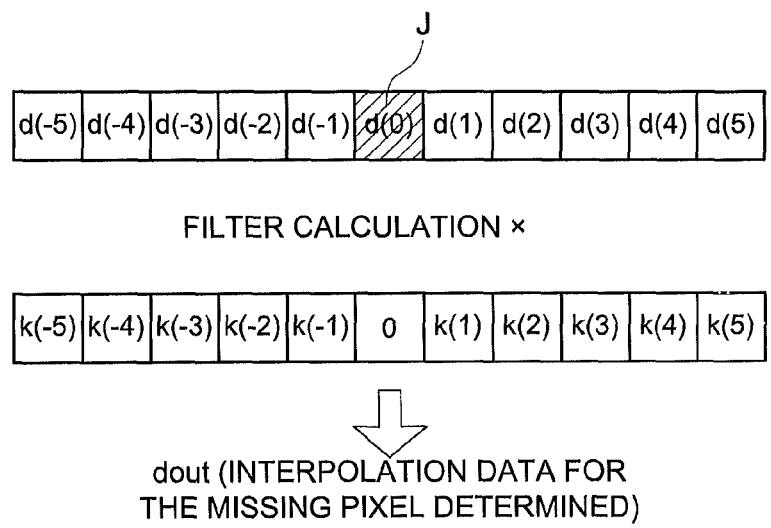

Weighting interpolation section 32 performs filter calculation with the missing pixel located at the center, and inserts a pixel value (a weighting interpolation value) obtained as the calculation result into input image signal 43 at the position corresponding to the missing pixel. The filter calculation is performed with respect to one dimensional (in the horizontal scanning direction) image data. As shown in FIG. 5a, in input image signal 43, image data are continuous even at the connection point between the n-th and the (n+1)-th sensor chips 12a. Weighting interpolation section 32, as shown in FIG. 5b, inserts a missing pixel into this connection point, and a pixel value of objective pixel J is determined by filter calculation while taking said missing pixel as objective pixel J and the its neighbor pixels as reference pixels. In interpolation coefficients utilized in filter calculation, the coefficient applied to objective pixel J is set to 0. This is because objective pixel J is a missing pixel and said pixel has no image data.

The pixel value (dout) of a missing pixel is induced by a convolution calculation of image data and interpolation coefficients with respect to pixels in the neighborhood of to the missing pixel. A calculation formula of a convolution calculation in the case of using filter coefficients of FIGS. 5a and 5b is as follows.

$$d\text{out}=(k(-5)d(-5)+k(-4)d(-4)+k(-3)d(-3)+k(-2)d(-2)+k(-1)d(-1)+k(1)d(1)+k(2)d(2)+k(3)d(3)+k(4)d(4)+k(5)d(5))/256 \quad \text{[Formula 1]}$$

wherein, d( ) is a pixel value of a pixel, k( ) is interpolation coefficient to be multiplied to a pixel value of the corresponding pixel. A value in ( ) shows the coordinates position of each pixel when objective pixel is assumed to be 0. k(0) is 0 because d(0) is a missing pixel.

Figure 6:
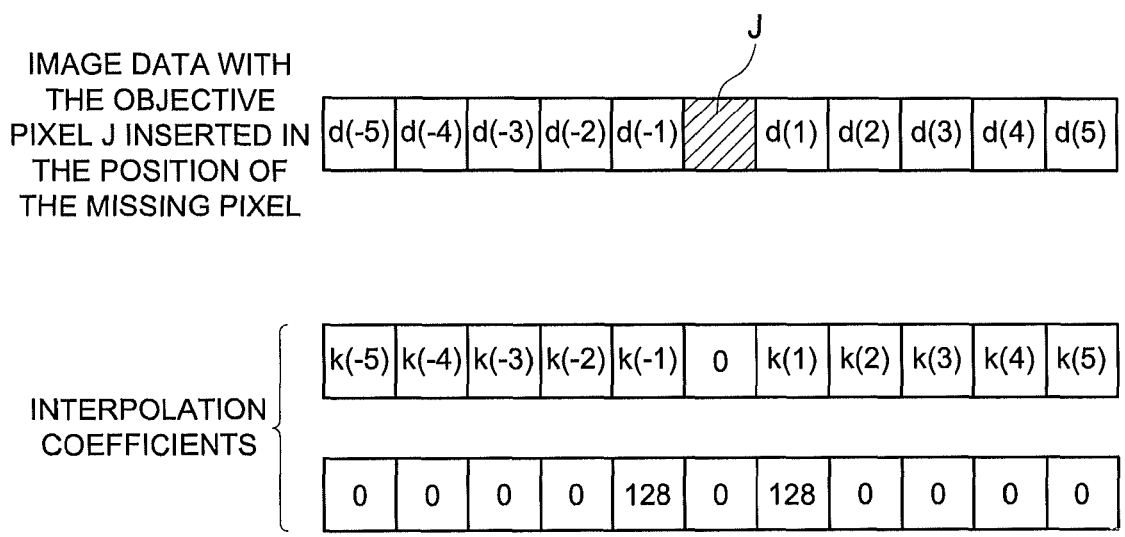
FIG. 6 is an explanation drawing to exemplify a coefficient of interpolation utilized in weighting interpolation processing.

FIG. 6 shows examples of interpolation coefficients. These example show that an average of two pixel values of the left hand side pixel and the right hand side pixel of the objective pixel is calculated as the pixel value (interpolated-data) for the missing pixel (objective pixel J).

<Frequency Decomposition Section 33>

Figure 7:
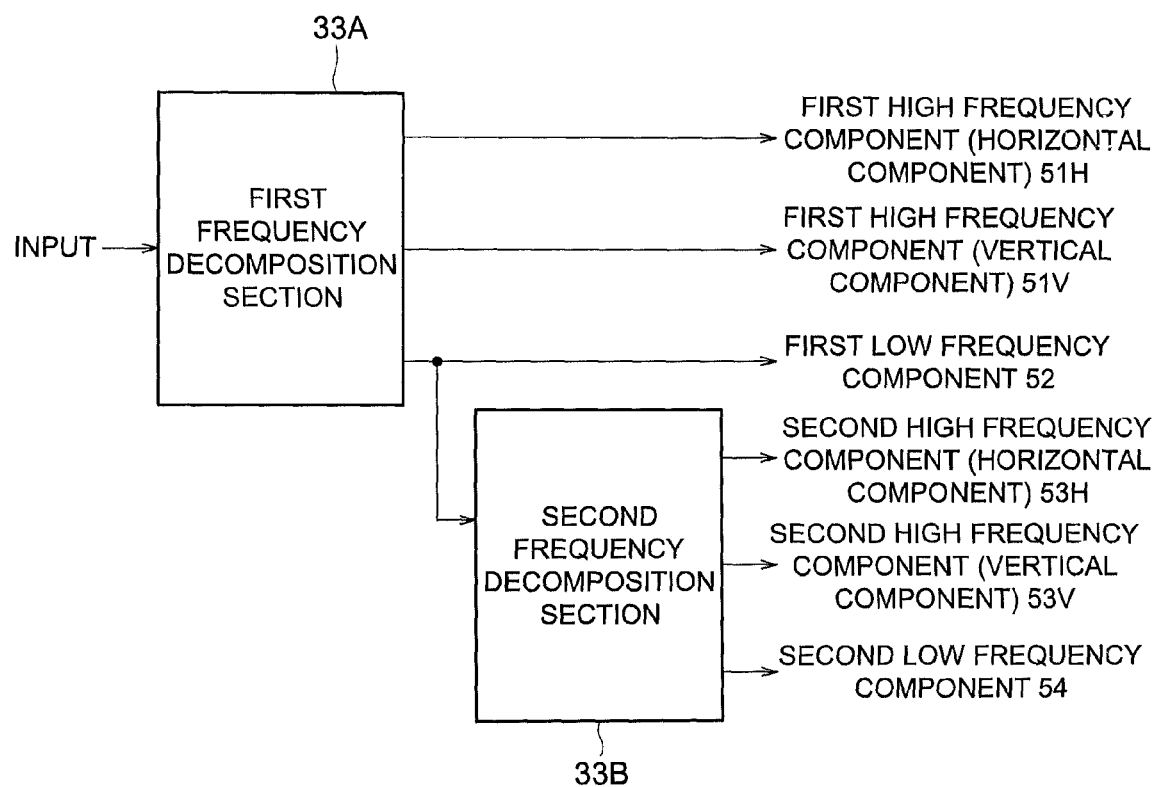
FIG. 7 is a block diagram to show a constitution of a frequency decomposition section in the case of two-step analysis.

Frequency decomposition section 33 decomposes two-dimensionally, in steps, primarily interpolated image signal 44 generated by weighting interpolation section 32 into a high frequency component and a low frequency component by use of wavelet transformation. FIG. 7 shows the case of two-step decomposition and shows signals produced from first frequency decomposition section 33A and second frequency decomposition section 33B in FIG. 4 in more detail.

First frequency decomposition section 33A outputs first high frequency component (horizontal component) 51H and first high frequency component (vertical component) 51V as a high frequency component, in two components—horizontal and vertical, and outputs first low frequency component 52 including both of a horizontal component and a vertical component as a low frequency component, without dividing into a horizontal component and a vertical component. Similarly, second frequency decomposition section 33B outputs second high frequency component (horizontal component) 53H and second high frequency component (vertical component) 53V, in two components—horizontal and vertical, and outputs second low frequency component 54 including both of a horizontal component and a vertical component as a low frequency component without dividing into a horizontal component and a vertical component.

Figure 8:
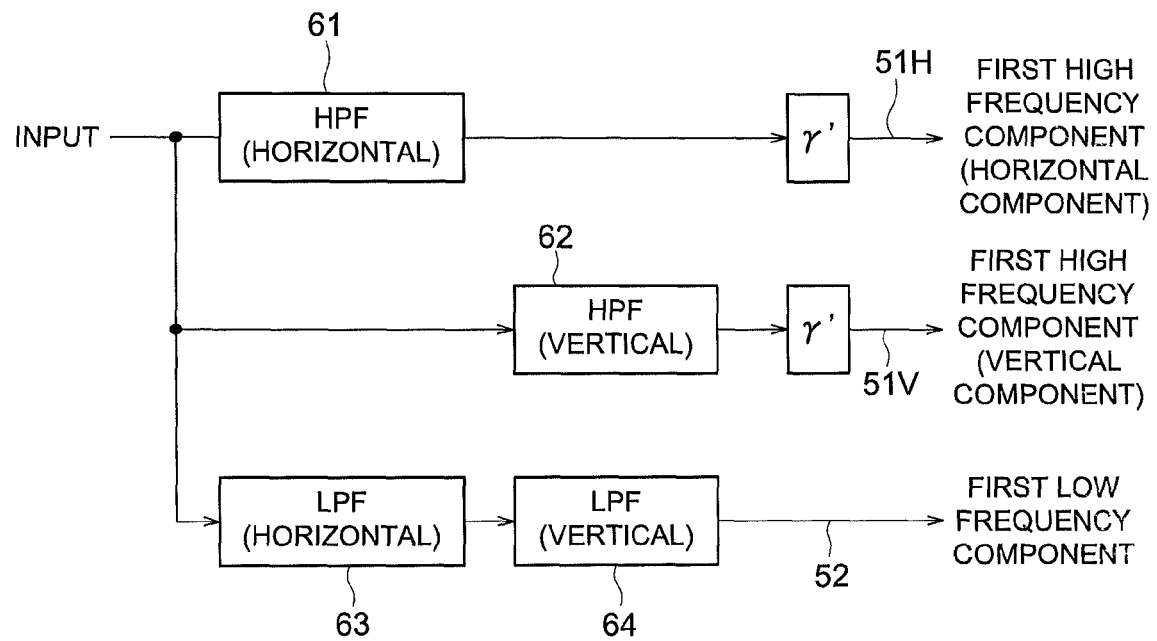
FIG. 8 is a block diagram to show an internal constitution of a frequency decomposition section for a single step.

FIG. 8 shows the internal constitution of first frequency decomposition section 33A as an internal constitution corresponding to one step of frequency decomposition section 33. An input signal, after having been passed through a high pass filter (HPF) 61 in the horizontal direction, which is multiplied with correction value γ' is output as first high frequency component (horizontal component) 51H. Further, an input signal, after having been passed through a high pass filter 62 in the vertical direction, which is multiplied with correction value γ' is output as first high frequency component (vertical component) 51V. An input signal, having been passed through a low pass filter (LPF) 63 in a horizontal direction and through a low pass filter 64 in the vertical direction, is output as first low frequency component 52. Constant coefficient γ' is generally set to such as 0.6667. Second frequency decomposition section 33B has a constitution similar to FIG. 8. However, constant coefficient γ' in second frequency decomposition section 33B is generally set to such as 0.8929.

FIG. 9 is filter coefficient table 70 to show an example of filter coefficients in high pass filters 61, 62 and low pass filters 63, 64 in FIG. 8. The corresponding image coordinates in filter coefficient table 70 show pixel coordinates in the horizontal direction with respect to an objective pixel assumed to be 0 in a low pass filter (LPF) and a high pass filter (HPF) in the horizontal direction. Further, they show pixel coordinates in the vertical direction with respect to an objective pixel assumed to be 0 in a low pass filter (LPF) and a high pass filter (HPF) in the vertical direction.

Figure 10:
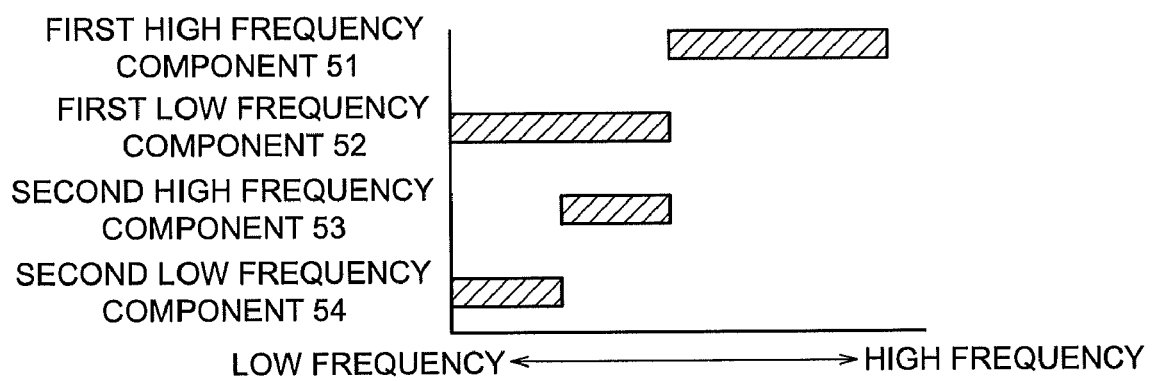
FIG. 10 is an explanation drawing to schematically show a frequency region of the frequency components having been decomposed by the first frequency decomposition section and the second frequency decomposition section.

FIG. 10 schematically shows frequency regions of the frequency components decomposed by first frequency decomposition section 33A and second frequency decomposition section 33B. Second low frequency component 54 is the lowest frequency component among the decomposed frequency components. Since second low frequency component 54 is generated by decomposition of first low frequency component 52 into a high frequency component and a low frequency component, first low frequency component 52 also contains the lowest frequency component among the decomposed frequency components. First high frequency component 51 and second high frequency component 53 are frequency components not containing the lowest frequency component.

<Correction Value Calculation Section 34>

Figure 11:
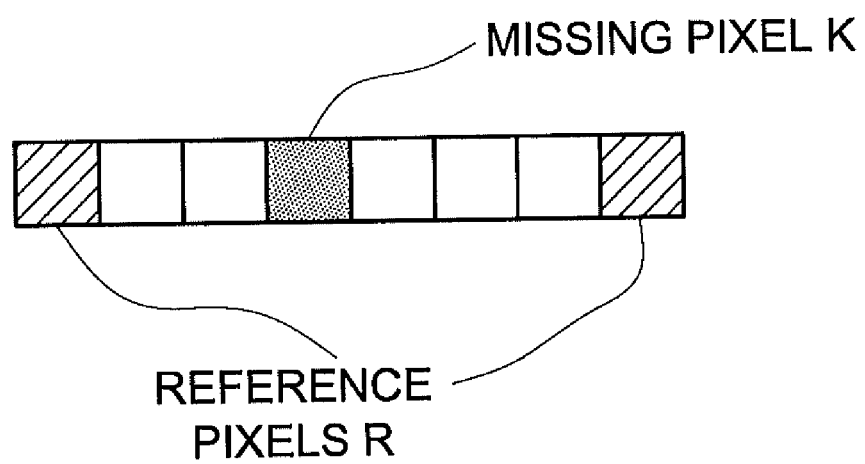
FIG. 11 is an explanation drawing to exemplify the positions of reference pixels to be referred to by a correction value calculating section.

Correction value calculation section 34 calculates a correction value by use of first low frequency component 52 or second low frequency component 54. In the following, the case of utilizing first low frequency component will be explained as an example. As shown in FIG. 11, a correction value for missing pixel K is calculated so that an average value of low frequency components at the positions of reference pixels R on left and right sides thereof is equal to a low frequency component at the position of missing pixel K, where the pixels which are located a predetermined number of pixels away from missing pixel K in left and right direction are assumed to be reference pixels R.

Wherein, when a correction value is DPR, a low frequency component of the right side reference pixel is s1r, a low frequency component of the left side reference pixel is s1l, a low frequency component of the missing pixel is s1m, a difference of low frequency components of a reference pixel and a missing pixel is diff, the calculation is expressed as follows.

$$\text{diff}=(s1r+s1l)/2-s1m \quad \text{(Equation 2)}$$

A correction value is calculated so as to make this diff to be 0.

Figure 12:
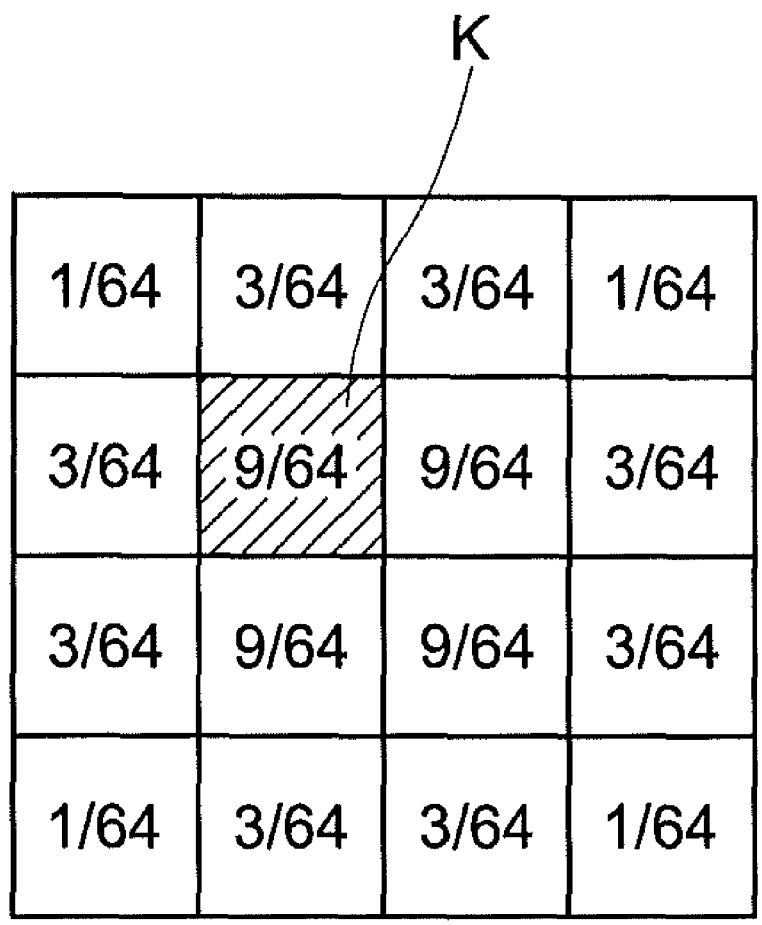
FIG. 12 is an explanation drawing to exemplify filter factors of a two-dimensional filter for low frequency component calculation.

A correction value for the missing pixel on the objective line (value to be added to first interpolation image data of the interpolated pixel) is assumed to be dpr, and the missing pixel is assumed to be corrected by dpr also in a neighbor line. For example, when a filter coefficient for extracting a low frequency component is assumed to be a two-dimensional filter coefficient shown in FIG. 12, low frequency component s1m of a pre-correction missing pixel can be determined by a calculation shown in FIG. 13a. A low frequency component of the missing pixel in the case of the same correction value dpr being added to an objective line and neighbor lines is as follows, as shown in FIG. 13b;

$$s1m+((3/64)dpr+(9/64)dpr+(9/64)dpr+(3/64)dpr)=s1m+(3/8)dpr$$

An average value of low frequency components of the reference pixels on left and right sides needs to be equal to a low frequency component of the corrected missing pixel (diff=0 in the above-described equation 2); therefore, $$s1m+(3/8)dpr=(s1r+s1l)/2 \text{ needs to be satisfied,}$$
thence $$dpr=(4/3)(s1r+s1l-2\times s1m) \text{ needs to be satisfied.}$$

In this way, correction value calculation section 34 calculates correction value dpr.

<Halftone Dot Extraction Section 35>

Figure 14:
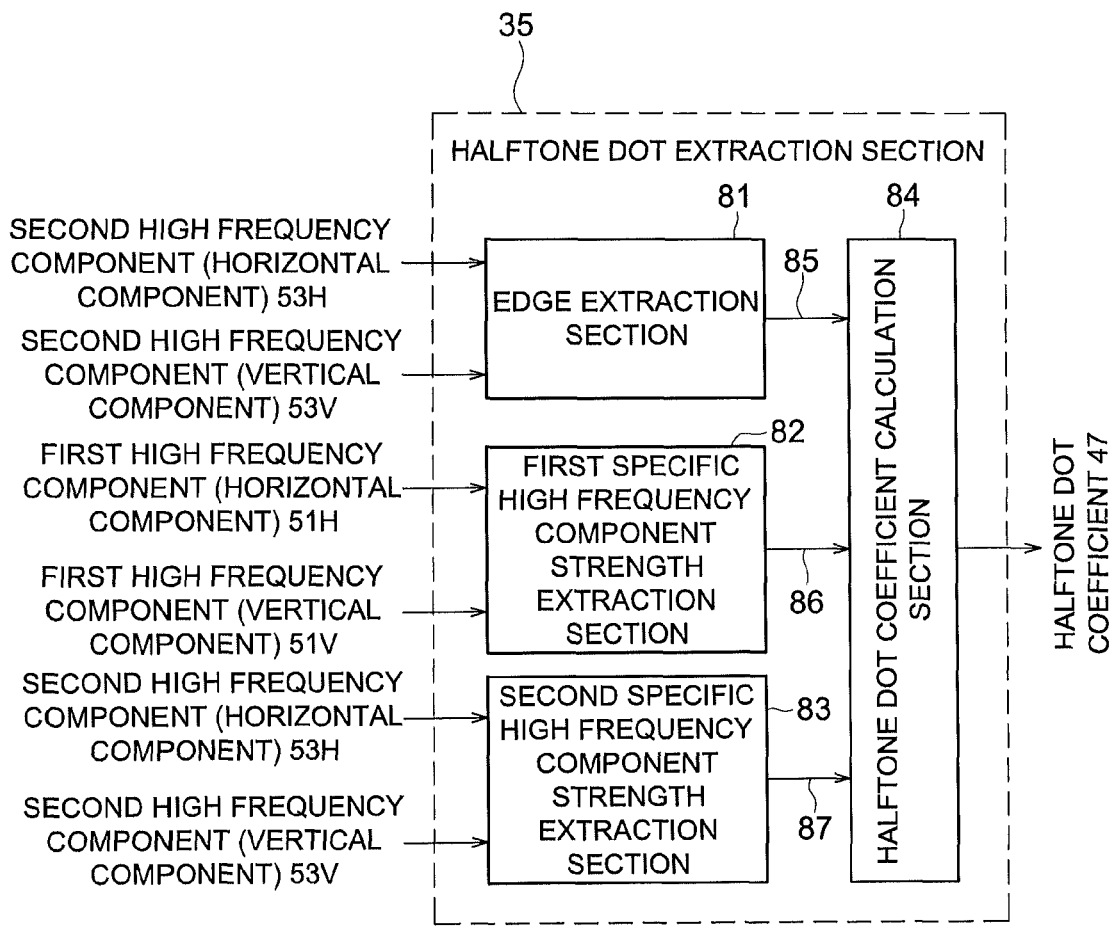
FIG. 14 is a block diagram to show an internal constitution of a halftone dot extraction section.

FIG. 14 shows the internal constitution of halftone dot extraction section 35. Halftone dot extraction section 35 is constituted by edge extraction section 81, first specific high frequency component strength extraction section 82, second specific high frequency component strength extraction section 83, and halftone dot coefficient calculation section 84.

Edge extraction section 81 reads in second high frequency component (horizontal component) 53H and second high frequency component (vertical component) 53V, and calculates therefrom edge extraction value 85 which shows a degree of probability that an objective pixel is located in an edge region.

First specific high frequency component strength extraction section 82 reads in first high frequency component (horizontal component) 51H and first high frequency component (vertical component) 51V, and calculates therefrom the strength of first high frequency component (first specific high frequency component strength 86) with respect to an objective pixel.

Second specific high frequency component strength extraction section 83 reads in second high frequency component (horizontal component) 53H and second high frequency component (vertical component) 53V, and calculates therefrom the strength of second high frequency component (second specific high frequency component strength 87) with respect to an objective pixel.

Halftone dot coefficient calculation section 84 reads in edge extraction value 85 from edge extraction section 81, first specific high frequency component strength 86 from first specific high frequency component strength extraction section 82, and second specific high frequency component strength 87 from second specific high frequency component strength extraction section 83, respectively, and calculates and outputs therefrom halftone dot coefficient 47 which shows the degree of an objective pixel being in a halftone dot region.

In a halftone dot region, since pixel values vary in a short cycle depending on a halftone dot pattern, the strength of a high frequency component increases. Further, also in an edge region such as a line, the strength of a high frequency component is large because pixel values suddenly change. Therefore, in halftone dot extraction section 35, the result of the strength of a high frequency component being subtracted by an edge extraction value is induced as halftone dot coefficient 47.

Figure 15:
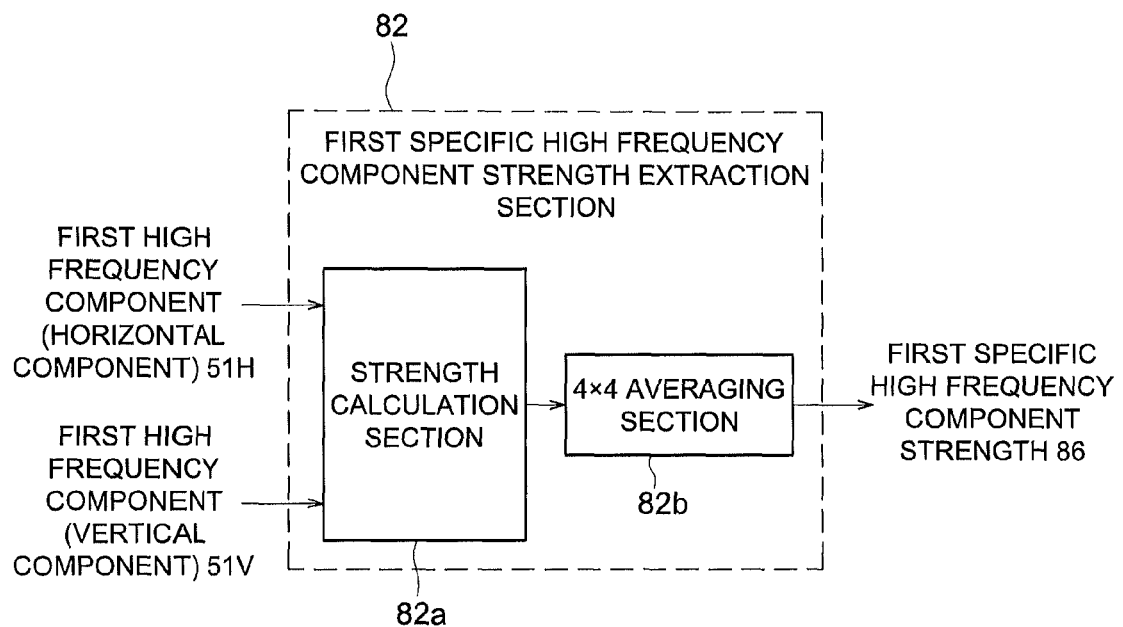
FIG. 15 is a block diagram to show a constitution of the first specific high frequency component strength extraction section.

FIG. 15 shows a constitution of first high frequency component strength extraction part 82. First specific high frequency component strength extraction section 82 is provided with strength calculation section 82a to calculate the strength by calculating a root mean square of first high frequency component (horizontal component) 51H and first high frequency component (vertical component) 51V, and 4×4 averaging section 82b to average the strength produced by strength calculation section 82a with respect to peripheral 4×4 pixels. Then, output of 4×4 averaging section 82b is produced as first specific high frequency component strength 86. In first specific high frequency component strength extraction section 82, after the strength is calculated by calculating a root mean square of first high frequency component (horizontal component) 51H and first high frequency component (vertical component) 51V, a value of the result averaged with respect to peripheral 4×4 pixels is produced as first specific high frequency component strength 86.

The calculation content in first specific high frequency component strength extraction section 82 is represented by the following equation.

$$w1 = \sqrt{wh1^2 + wv1^2} \quad \text{[Formula 2]}$$

$$wave1(x, y) = \sum_{X=x-1}^{x+2} \sum_{Y=y-1}^{y+2} w1(X, Y)$$

wherein, wh1 is first high frequency component (horizontal component) 51H and wv1 is first high frequency component (vertical component) 51V. Further, wave1 (x, y) is first specific high frequency component strength 86 at the coordinates (x, y). The internal constitution of second specific high frequency component strength extraction section 83 is similar to that of first specific high frequency component strength extraction section 82, and the explanation will be omitted.

Figure 16:
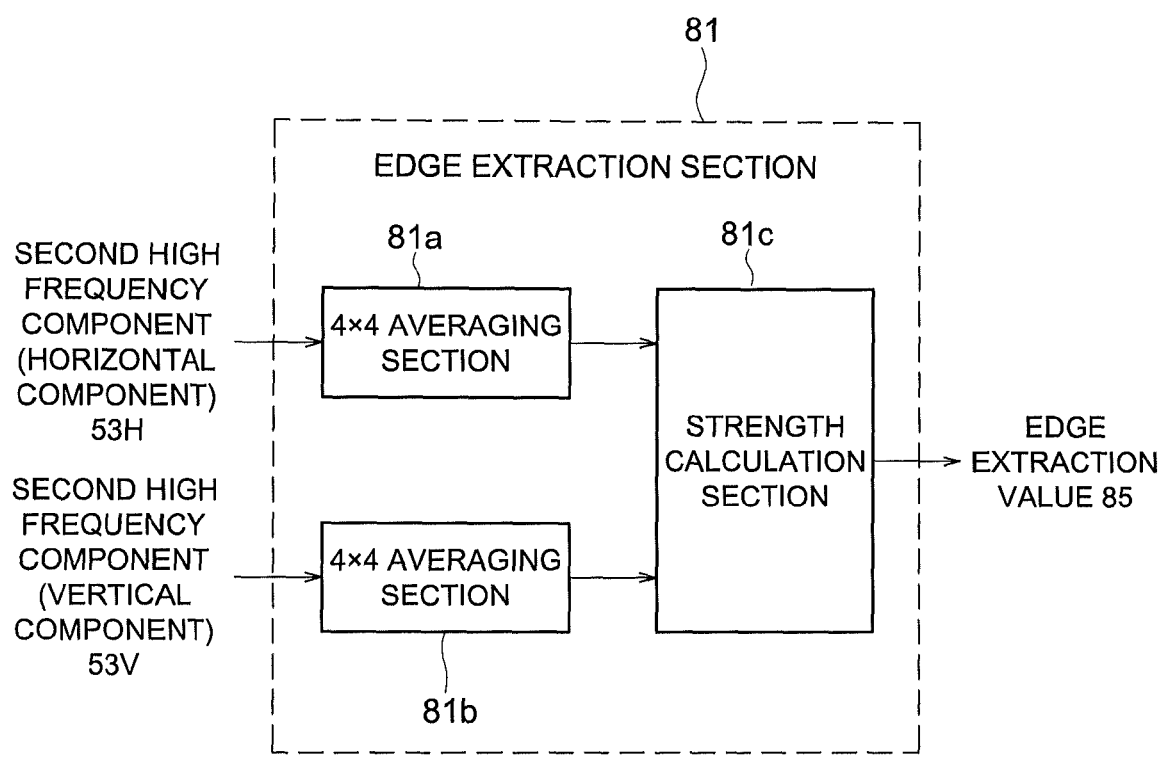
FIG. 16 is a block diagram to show a constitution of an edge extraction section.

FIG. 16 shows a constitution of edge extraction section 81. Edge extraction section 81 is provided with 4×4 averaging section 81a to average second high frequency component (horizontal component) 53H with respect to peripheral 4×4 pixels, 4×4 averaging section 81b to average second high frequency component (vertical component) 53V with respect to peripheral 4×4 pixels, and strength calculation section 81c to calculate a root mean square of output of 4×4 averaging section 81a and output of 4×4 averaging section 81b. Then, edge extraction section 81 outputs output of strength calculation section 81c as edge extraction value 85. In edge extraction section 81, second high frequency component (horizontal component) 53H and second high frequency component (vertical component) 51V each are independently averaged with respect to neighbor 4×4 pixels, and then a root mean square thereof is calculated to obtain edge extraction value 85.

The calculation content in edge extraction section 81 is represented by the following equation.

[Equation 3]
$$whave(x, y) = \sum_{X=x-1}^{x+2} \sum_{Y=y-1}^{y+2} wh2(X, Y)$$

$$wvave(x, y) = \sum_{X=x-1}^{x+2} \sum_{Y=y-1}^{y+2} wv2(X, Y)$$

$$dee(x, y) = \sqrt{whave(x, y)^2 + wvave(x, y)^2}$$

wherein, wh2 (x, y) is second high frequency component (horizontal component) 53H at the coordinate (x, y), wv2 (x, y) is second high frequency component (vertical component) 53V at the coordinate (x, y), and dee (x, y) is edge extraction value 85 at the coordinate (x, y).

When frequency decomposition is performed by wavelet transformation, a signal value is positive at the part where pixel values vary in positive slope (for example, vary to black from white) while it is negative at the part where pixel values vary in negative slope (for example, vary to white from black). In a halftone dot region, a high frequency component becomes a value near to "0" by averaging because pixel values periodically vary in a short cycle. That is, in a halftone dot region, an averaged value becomes to a low value because the value of high frequency component periodically varies and has low continuity.

On the other hand, in an edge region such as an outline, for example, black region continues for some extent after a change to black from white. That is, change of pixel values is not periodically repeated but occurs once in a while and similar pixel values continue for a while after the change. Therefore, pixel values become positive or negative at an edge portion where pixel values change once and values near to 0 continue for a while after the change. Thus, when a high frequency component is averaged with respect to a region of approximately 4×4 pixels, either a positive or negative pixel value will appear in an edge region. Therefore, edge extraction value 85 becomes approximately 0 in a halftone dot region, and it is a certain value in an edge region. It should be noted that in edge extraction section 81, to suitably detect presence or absence of periodicity, a horizontal component and a vertical component are averaged individually followed by calculation of a root mean square thereof.

To edge extraction section 81 is preferably fed with second high frequency component (horizontal component) 53H. The reason for this is as follows. An edge region, because of its one-shot change, has frequency components over a wide frequency region and also contains a low frequency component. Therefore, second high frequency component (horizontal component) 53H, which is a middle frequency component, shows a high value in an edge region, which contains a plenty of low frequency component. On the other hand, a halftone dot region having a line number larger than a certain number where stripe shaped moire may be generated by interpolation at weighting interpolation section 32, contain less low frequency component as the line number is larger, resulting in low second high frequency component (horizontal component) 53H. Thus, by utilizing second high frequency component (horizontal component) 53H compared to utilizing first high frequency component (horizontal component) 51H, t is also apt to be high in an edge region and low in a halftone dot region, resulting in a remarkable difference in edge extraction value 85.

Figure 17:
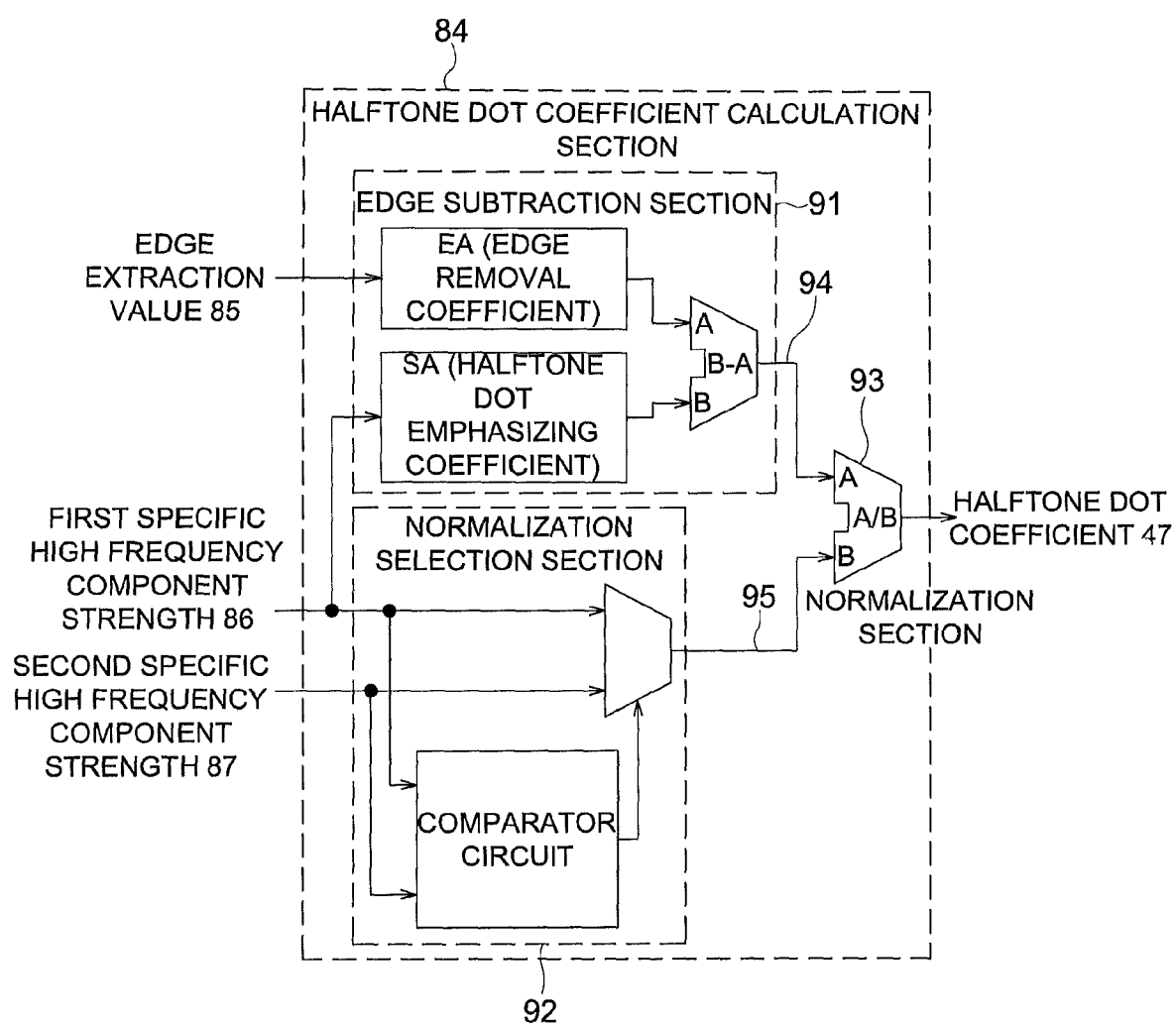
FIG. 17 is a block diagram to show a constitution of a halftone dot coefficient calculation section.

FIG. 17 shows a constitution of halftone dot coefficient calculation section 84. As described above, since a high frequency component appears in both of a halftone dot region and an edge region, first specific high frequency component strength 86 shows a large value also in an edge region in addition to a halftone dot region having a frequency component higher than a certain frequency. Therefore, halftone dot coefficient calculation section 84 removes an edge region from first specific high frequency component strength 86.

Halftone dot coefficient calculation section 84 is provided with edge subtraction section 91, normalization selection section 92 and normalization section 93. Edge subtraction section 91 reads in edge extraction value 85 and first specific high frequency component strength 86, and outputs a value, which is calculated by subtracting the value of edge extraction value 85 multiplied by EA from the value of first specific high frequency component strength 86 multiplied by halftone dot emphasizing coefficient SA, as pre-normalization halftone dot coefficient 94.

When halftone dot emphasizing coefficient SA is large, the edge is not sufficiently removed, and when edge removal coefficient EA is large, the edge is not very much included. Edge removal coefficient EA should be large in order for a correction object not to include much edge region, and halftone dot emphasizing coefficient SA should be large in order for a halftone dot region not to generate much miss-correction.

Normalization selection section 92 calculates a representative value for normalizing pre-normalization halftone dot coefficient 94 produced by edge subtraction section 91. In normalization selection section 92, first specific high frequency component strength 86 is compared to second specific high frequency component strength 87, and the larger one of them is output as representative value 95.

Normalization section 93 outputs the value of pre-normalization halftone dot coefficient 94 divided by representative value 95, as halftone dot coefficient 47.

A vale of pre-normalization halftone dot coefficient 94 depends on the amplitude of halftone dot, and is larger when the amplitude is larger. To cancel this amplitude dependence, normalization is performed using the larger one of first specific high frequency component strength 86 and second specific high frequency component strength 87. If first specific high frequency component strength 86 is larger than second specific high frequency component strength 87, the calculation content in halftone dot coefficient calculation section 84 is ((first specific high frequency component strength 86−edge extraction value 85)/first specific high frequency component strength 86). Thus, in a non-edge region, where edge extraction value is nearly 0, the output value (halftone dot coefficient 47) output from normalization section 93 is close to 1 (to be 1 in the case of edge extraction value 85 being 0).

On the other hand, In the case of second specific high frequency component strength 87 being larger than first specific high frequency component strength 86, the calculation content is ((first specific high frequency component strength 86−edge extraction value 85)/second specific high frequency component strength 87). Thus, in a non-edge region, the output value (halftone dot coefficient 47) output from normalization section 93 is close to 0.

In a halftone dot region which has a line number larger than a certain number and in which moire is generated by weighting interpolation in weighting interpolation section 32, since first specific high frequency component strength 86 is larger than second specific high frequency component strength 87, halftone dot coefficient is 1. On the other hand, there is a tendency that second specific high frequency component strength 87 is large when the line number is small, and when it is larger than first specific high frequency component strength 86, a halftone dot coefficient is close to 0.

Missing pixel interpolation processing section 30 is configured to aim that a pixel value determined by weighting interpolation is corrected only when the missing pixel is located in a halftone dot region which has a line number larger than a certain number so that stripe-shaped moire is generated by weighting interpolation in weighting interpolation section 32; and correction is not performed when the missing pixel is located in other regions. Further, in missing pixel interpolation processing section 30, correction using a correction value is performed as a halftone dot coefficient is the closer to 1, therefore, halftone dot coefficient 47 desirable to meet the above-described object is obtained by normalizing pre-normalization halftone dot coefficient 94 by the larger one of first specific high frequency component strength 86 and second specific high frequency component strength 87.

Herein, second specific high frequency component strength 87 is larger than first specific high frequency component strength 86 in a halftone dot region having a low line number and an edge region, and it is not preferable, in this case, that normalization is performed using the first specific high frequency component strength 86, which is smaller. That is because, if the smaller one is used, the calculation content is made to be ((first specific high frequency component strength 86–edge extraction value 85)/first specific high frequency component strength 86), thus a value of halftone dot coefficient 47, which is the calculation result, is 1 (the maximum is 1), hence the pixel value for the missing pixel is subjected to correction. Thus, missing pixels in a halftone dot region having a small line number and an edge region will be corrected using a correction value, which operation is against the above-described object.

<Halftone Dot Coefficient Selection Section 36>

Halftone dot extraction section 35 calculates halftone dot coefficient 47 which shows the degree of a region where a missing pixel exists being located in a halftone dot region, by utilizing pixels left and right to the missing pixel as reference pixels. Further, halftone dot extraction section 35 calculates plural halftone dot coefficients using different reference pixels. Halftone dot coefficient selection section 36 selects and outputs the smallest one among said plural halftone dot coefficients calculated as correction value 48.

Pixels at distances of 3 pixels and 4 pixels left and right from the missing pixel are used as the reference pixels. If pixels closer to the missing pixel than the above are the reference pixels, a missing pixel may be included in a reference region for halftone dot coefficient calculation (within a calculation region of LPF and HPF), whereby the missing pixel is affected by the weighting interpolation result in weighting interpolation section 32. On the other hand, when the reference pixels are more distant from a missing pixel is larger than the above described distance, the relationship between the reference pixels and the region where the missing pixel is located is smaller, whereby a non-halftone dot region having no correlation may more likely be referenced. Therefore, the pixels as close as possible to the missing pixel should be selected as the reference pixels provided that they are not included in the reference region for calculating the halftone dot coefficients.

The reason why each 2 pixels (the third pixel and the fourth pixel) at different distances from the missing pixel on both left and right side are used as the reference pixels is as follows.

Regarding closely existing two edges, edge extraction values may cancel each other, whereby a halftone coefficient may be large in a non-halftone dot region, in which situation correction error may be caused. For example, in a region where two black lines are closely located, the pixel values change like black-white-black. In this case, when the frequency decomposition is performed by the wavelet translation, the signal value of the different frequency components has a positive value in a region where the pixel values change with a positive slope (e.g. changing from white to black); and has a negative value in a region where the pixel values change with a negative slope (e.g. changing from black to white). Thus, when the pixel values change like black-white-black between closely located two edges, a positive value and a negative value may cancel each other, thereby generating a singular point. If this singular point is included in the reference pixels, although the singular point is on the boundary between the closely located two edges, the halftone dot coefficients for that point has a large value, thereby causing a correction error.

Since the singular point where the edge extraction values cancel each other is generated only on one pixel, using adjacent two pixels as reference pixels prevents such a correction error from occurring.

<Correction Section 37>

Correction section 37, as shown in FIGS. 3 and 4, is equipped with multiplier 37a which multiplies correction value 46 transmitted from correction value calculation section 34 by correction coefficient 48 transmitted from halftone dot coefficient selection section 36; gate 37b which transmits the output of multiplier 37 to the following stage only during the term of missing pixel index signal 42 being active; and adder 37c to add the output of gate 37b to the primarily interpolated image signal 44 transmitted from weighting interpolation section 32, and correction section 37 outputs the output of adder 37c as output image signal 49 as the result of interpolation.

Gate 37b transmits "0" to adder 37e in the following stages, during the term other than missing pixel index signal 42 is active.

The above arrangement causes missing pixel interpolation processing section 30 to output input image signal 43 as output image signal 49 in the portion other than the missing pixel; and to output as output image signal 49 the value obtained by adding correction value 46 at a ration corresponding to a halftone dot degree (correction coefficient 48) to weighting interpolation value generated by weighting interpolation section 32 in the portion of the missing pixel.

Thus, it is possible to interpolate the missing pixel with a high precision also in the halftone dot region. Further, since primarily interpolated image signal 44 which has been primarily interpolated in weighting interpolation section 32 is subjected to frequency decomposition, and correction value 46 is calculated using the low frequency component thereof, and a degree for the missing pixel to be in a halftone dot region (halftone dot coefficient 47) is calculated using the high frequency component. Thus, it is possible to determine correction value 46 and halftone dot coefficient 47 with less complexity of a circuit constitution and processing. Further, since halftone dot degree is made to be in a range from 0 to 1 and correction using correction value 46 is performed at a ratio corresponding to the halftone dot degree, the interpolation is performed with higher precision than using the method in which correction is preformed by an alternative selection method to use or not to use correction value 46.

Next, the second embodiment will be explained.

Figure 18:
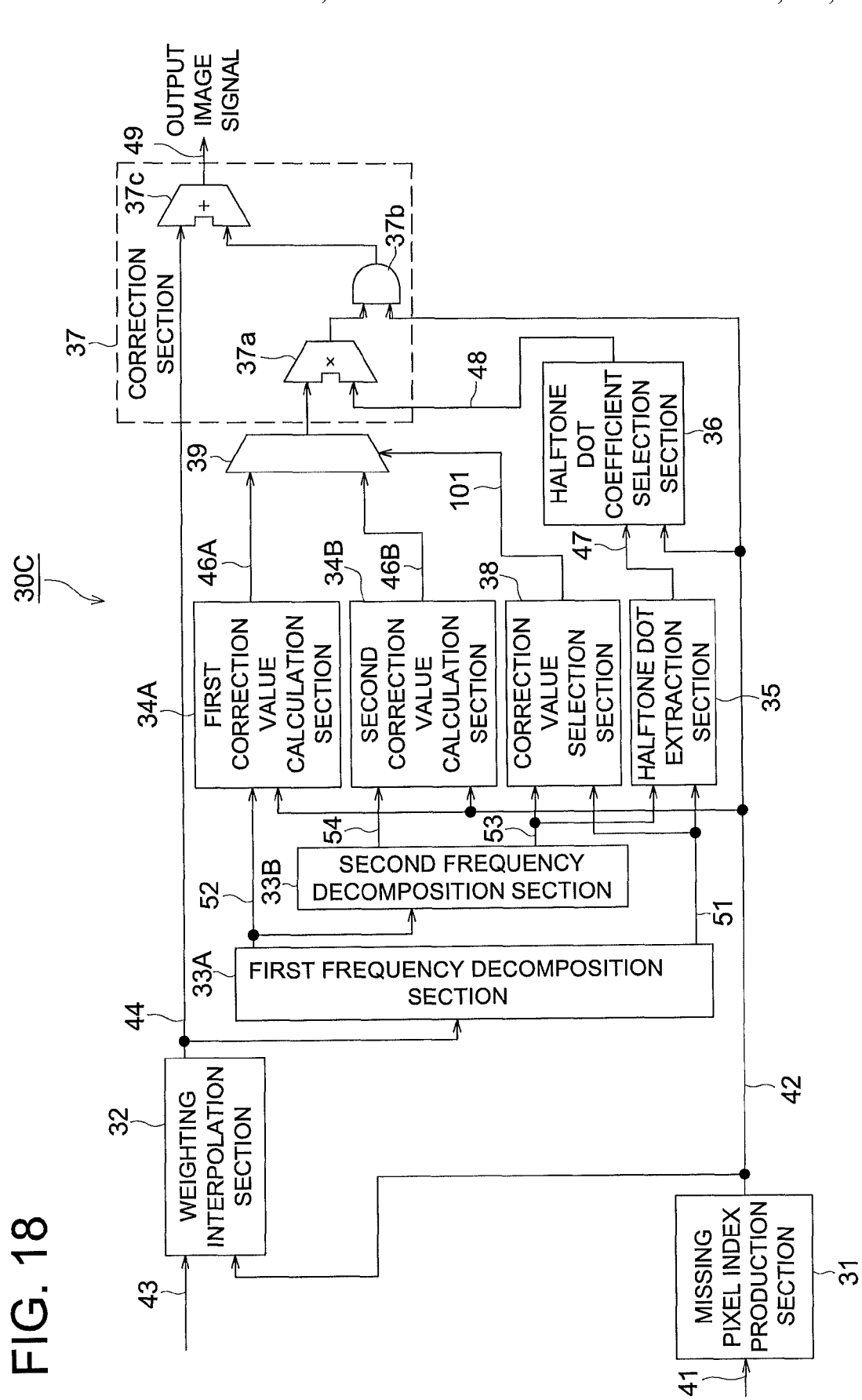
FIG. 18 is a block diagram to show a constitution of a missing pixel interpolation processing section according to a second embodiment.

FIG. 18 shows a constitution of missing pixel interpolation processing section 30C according to the second embodiment.

In missing pixel interpolation processing section 30C, two kinds of correction values are determined and either one of them is selectively used. The identical symbols are assigned to the components identical to those in missing pixel interpolation processing section 30B of FIG. 4, and explanation thereof will be omitted.

Defect image interpolation processing section 30 is equipped with first correction value calculation section 34A which reads in first low frequency component 52 and calculates first correction value 46A based on said first low frequency component 52; second correction value calculation section 34B which reads in second low frequency component 54 and calculates second correction value 46B based on said second low frequency component 54; correction value selection section 38 which reads in first high frequency component 51 and second high frequency component 53 and outputs selection signal 101 indicating which one to choose from first correction vale 46A and second correction value 46B; and selection section 39 which choose either one of first correction value 46A and second correction value 46B based on selection signal 101, and defect image interpolation processing section 30 transmit it to correction section 37 as correction value 46.

First correction value 46A which is calculated by first correction calculation section 31A utilizing first low frequency component 52 exhibits a large effect in a region having a high frequency component (a halftone dot region of a high line number). Second correction value 46B which is calculated by second correction calculation section 34B utilizing second low frequency component 54 exhibits a large effect in a region having an intermediate frequency component. Therefore, correction value selection section 38 chooses either of first correction value 46A or second correction value 46B should be used, depending on the frequency component.

In detail, normalized high frequency component NW is calculated according to the following equation, and selection signal 101 is determined according to selection table 110 in FIG. 10 based on the magnitude of normalized high frequency component NW.

In the case of WA1<WTH and WA2<WTH; NW=0
Other than the above case; NW=WA2/max(WA1, WA2)
wherein, WA1 is first high frequency component 51 averaged with respect to 2×2 pixels, WA2 is second high frequency component 53 averaged with respect to 2××2 pixels, max (A, B) is the larger one of A and B, and WTH is a constant. RTH in selection table 110 is a correction value selecting threshold value and is a constant.

In this manner, in missing pixel interpolation processing section 30C according to the second embodiment, since a correction value suitable for a frequency component (line number) of a halftone dot region is selected, it is possible to more suitably correct a weighting interpolation value so as to interpolate a missing pixel with high precision.

Next, the third embodiment will be explained.

Figure 20:
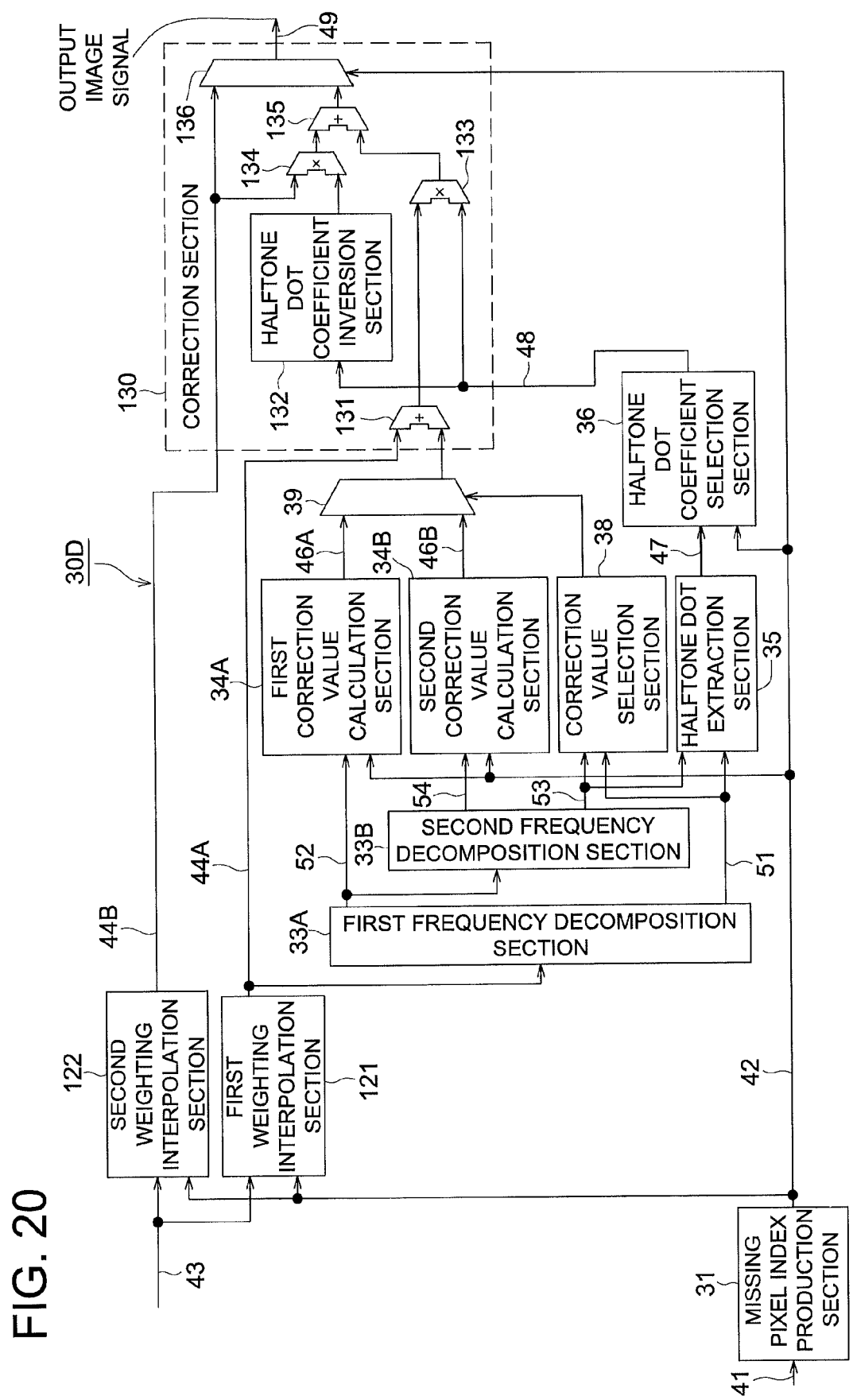
FIG. 20 is a block diagram to show a constitution of a missing pixel interpolation processing section according to a third embodiment.

FIG. 20 shows a constitution of missing pixel interpolation processing section 30D according to the third embodiment. Identical symbols are assigned to the components identical to missing pixel interpolation processing section 30C in FIG. 18, and explanation thereof will be omitted.

Missing pixel interpolation processing section 30D is equipped with first weighting interpolation section 121 and second weighting interpolation section 122 as a weighting interpolation section. First weighting interpolation section 121 outputs primarily interpolated image signal 44A for a halftone dot region and second weighting interpolation section 122 outputs primarily interpolated image signal 44B for a non-halftone dot region. Primarily interpolated image signal 44A, similar to primarily interpolated image signal 44 in the first and second embodiments, is transmitted to first frequency decomposition section 33A to be utilized for calculating a correction value.

Missing pixel interpolation processing section 30D is equipped with correction section 130 instead of correction section 37 in FIG. 18. Correction section 130 is equipped with first adder 131 in which primarily interpolated image signal 44A is added to a correction value produced by selection section 39; first multiplier 133 in which output of first adding device 131 and correction coefficient 48 produced by halftone dot coefficient selection section 36 are read in to be multiplied; halftone dot coefficient inversion part 132 to inverse correction coefficient 48 (subtract it from 1); second multiplier 134 in which primarily interpolated image signal 44B is multiplied by the output of halftone dot coefficient inversion part 132; second adder 135 in which the output of first multiplier 133 is added to the output of second multiplier 134; and output selection section 136 in which the output of second adder 135 is chosen when missing pixel index signal 42 is active, and primarily interpolated image signal 44B is chosen when missing pixel index signal is inactive, and in which the chosen signal is output as output image signal 49.

Correction section 130 chooses primarily interpolated image signal 44B fed from second weighting interpolation section 122 in the portion other than missing pixels (missing pixel index signal 42 is inactive), and outputs the selected signal as output image signal 49. Correction section 13 outputs as output image signal 49, in the portion of a missing pixel (missing pixel index signal 42 is active), a value obtained by synthesizing primarily interpolated image signal 44A with a correction value added thereto and primarily interpolated image signal 44B, at the ratio corresponding to correction coefficient 48. In particular, as output image signal 49, output is a value produced by adding up the following two values: the value obtained by multiplying, in first multiplier 133, primarily interpolated image signal 44A with the correction value added thereto in first adder 131 by correction coefficient 48; and the value obtained by multiplying, in second multiplier 134, the value obtained by inversing correction value 48 in halftone dot in coefficient inversion part 132 (1−correction coefficient 48) by primarily interpolated image signal 44B, are added in second adder 135.

As the interpolation coefficients of first weighting interpolation section 121, used is one having a characteristic to maintain a high frequency region. Thus, the interpolation performance is improved in the halftone dot region, and a smaller amount needs to be corrected using the correction value. As the interpolation coefficients of second weighting interpolation section 122, set is one for enabling preferable interpolation in the non-halftone dot region with respect to a line image and a natural image. For example, a linear interpolation is used. Thus, an image is improved in the non-halftone dot region, with continuity of an image maintained.

Missing pixel interpolation processing section 30D can perform interpolation of a missing pixel more precisely, because in a halftone dot region, primarily interpolated image signal 44A having been interpolated by using the interpolation coefficients for the halftone dot region and then having been corrected by the correction value is used at a higher ration to synthesize; and in the non-halftone dot region, primarily interpolated image signal 44B having been interpolated by use of the interpolation coefficients suitable for the non-halftone dot is used at a higher ratio to synthesize.

Figure 21:
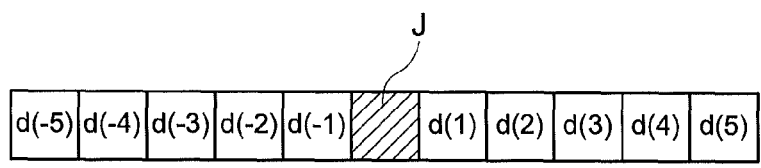
FIG. 21 is an explanation drawing to show an example of the first interpolation coefficients utilized in the first weighting interpolation section, and the second interpolation coefficients utilized in the second weighting interpolation section.
Figure 21:
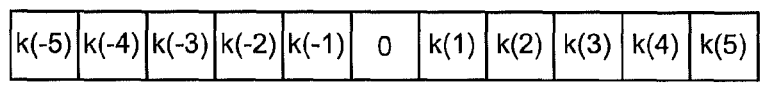
Figure 21:
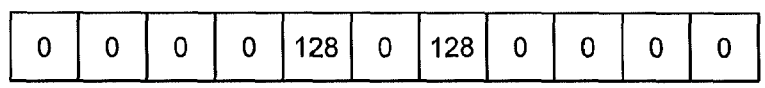
Figure 21:
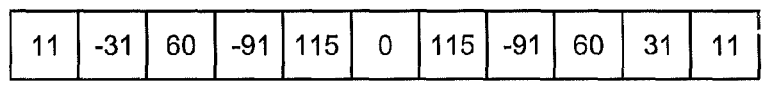

FIG. 21 shows an example of first interpolation coefficients 141 utilized in first weighting interpolation section 121 and second interpolation coefficients 142 utilized in second weighting interpolation section 122. In second interpolation coefficients 142, each one pixel on the left and the right of and next to the missing pixel (objective pixel J) are used as reference pixels; and in first interpolation coefficients 141, each five pixels on the left and the right of and next to the missing pixel (objective pixel J) are used as reference pixels. Which means that second interpolation coefficients 142 has a narrower reference region of the reference pixels than first interpolation coefficients 141.

The embodiments of this invention have been explained above in reference to the drawings, but a particular constitution is not limited thereto, and it is intended that the present invention covers modifications and variations of this invention as far as they come within the scope of this invention.

In FIGS. 4, 18 and 20, an example of frequency decomposed through two steps has been shown; however, the frequency decomposition may be performed in only single step. In the case of frequency decomposition is performed through single step, normalization of pre-normalization halftone dot coefficient 94 may be performed, for example, by detecting the amplitude of a practical image in input image signal 43 and by normalizing by using the detected amplitude.

Further, a boundary frequency, in the case of analysis into a high frequency component and a low frequency component, may be appropriately set. It is preferably set depending on a line number of a halftone dot region which generates such as moire. That is, in a halftone dot region having a line number which generates such as moire, it is preferable to perform frequency decomposition into a high frequency component and a low frequency component so as to make the strength of a high frequency component larger than the strength of a low frequency component.

According to the embodiment of this invention, moire in the halftone dot region, which is generated in the case of interpolation of a missing pixel only by weighting interpolation, is corrected by the correction value depending on the degree for the region in the vicinity of the missing pixel to be in the halftone dot region. Thereby, the moire in a halftone dot region is decreased. Further, since correction is performed depending on the degree to be in the halftone dot region, more suitable correction is possible. Correction is performed only in the halftone dot region with out correcting in the non-halftone dot region.

Further, since primarily interpolated image signal produced by the weighting interpolation section is decomposed into a high frequency component and a low frequency component, a halftone dot degree is calculated by using the high frequency component, and the correction value is calculated by using a low frequency component, it is possible to determine the halftone dot degree and the correction value by a relatively simple process.

According to the embodiment of this invention, to the pixel value of the missing pixel determined in the weighting interpolation section is added the correction value depending on the halftone dot degree. For example, to the pixel value of the missing pixel determined in the weighting interpolation section is added the multiple of the correction value and the halftone dot degree.

According to the embodiment of this invention, the second weighting interpolation section produces the second primarily interpolated image signal by weighting interpolation suitable for the low frequency region, and weighting interpolation section produces primarily interpolated image signal by weighting interpolation processing suitable for the high frequency region. This interpolation image signal is subjected to frequency decomposition to be utilized for judgment of the halftone dot region (calculation of a halftone dot degree) and calculation of the correction value. Further, the second interpolation value for the primarily interpolated image signal and the value of the primarily interpolated image signal corrected by the correction value are synthesized depending on the ratio corresponding to the halftone dot degree is produced as the final interpolation pixel value of the missing pixel. For example, when the halftone dot degree is assumed to be a value in a range from 0 to 1, and the halftone dot degree is closed to 1, the degree of being in the halftone dot area is assumed to be higher; the above synthesis is performed by the following formula:

(the interpolation value in the primarily interpolated image signal corrected by the correction value)× halftone dot degree+(the interpolation value in the second primarily interpolated image signal)× (1−halftone dot degree)

Since the primarily interpolated image signal obtained by weighting interpolation processing suitable for a high frequency region is utilized to calculate a correction value, the correction amount is decreased compared to the case of utilizing the second primarily interpolated image signal obtained by weighting interpolation processing suitable for a low frequency region. That is, since weighting interpolation more suitable for a halftone dot region is performed with a smaller correction amount in a halftone dot region while interpolation suitable for a non-halftone dot region is performed in a non-halftone dot region, a good image can be obtained.

Since the halftone dot region is a region representing an intermediate value by plural pixels, in the above-described embodiment, when the missing pixel is located in the halftone dot region, the correction is performed so as to make the difference between the following two values small (preferably to be 0): the low frequency component of the missing pixel (corresponding to the average value of pixels in neighbor region including the missing pixel); and the low frequency component in the reference pixels in the vicinity of the missing pixel (corresponding to the average value of pixel values in the neighbor region of the missing pixel not including the missing pixel). Thereby, when the missing pixel existing is located in the halftone dot region, suitable correction of the weighting interpolation value is realized.

When a low frequency component containing more high frequency component is utilized for calculation of the correction value, since this low frequency component containing a high frequency component has a relatively narrow range of reference pixels, the correction is performed with high precision based on a neighbor region of the missing pixel. However, when the high frequency component corresponding to the frequency component of the halftone dot is contained, the averaging is not appropriately performed, thereby obtaining no stable correction value. Therefore, for the calculation of the correction value, it is preferable to utilize the low frequency component containing the higher frequency component within the range of not containing the frequency component with which halftone dot is provided. Therefore, when the missing pixel is located in the halftone dot region having a higher frequency component (a high line number) among halftone dot regions suitable for correction, since a generation cycle of moire in the sub scanning direction is short, a correction value is calculated by using the low frequency component containing a higher frequency component. On the other hand, when the missing pixel is located in the halftone dot region having a low line number, a lower frequency component than a frequency component with which the halftone dot is provided is utilized for the calculation of the correction value. Thereby, a more suitable correction value can be obtained depending on the line number of halftone dot.

When using only one pixel in the vicinity of the missing pixel as a reference pixel, it may be a singular point undesirable for calculation of a halftone dot degree. In that case, the halftone dot coefficient will be a large value in the non-halftone dot region. Since a plurality of singular points do not appear, choosing the smallest one from the halftone coefficients calculated for a plurality of reference pixels prevents an error caused by the singular point.

According to the embodiment of this invention, in the specific high frequency component strength extraction section, it is possible to extract the halftone dot region as a specific high frequency strength by extracting a frequency component (a specific high frequency component) which is included in a halftone dot region suitable for correction. However, since an edge region also contains a specific high frequency component, an edge region is also contained in a region having higher specific high frequency strength. Therefore, an edge component is extracted by analysis of the high frequency component (calculation of an edge extraction value), and from the specific high frequency strength is subtracted the edge extraction value so as to obtain the halftone dot coefficient. That is, the edge region may be corrected with error when corrected using the correction value, and to avoid this error the edge region is removed from the correction object.

There is a tendency that a frequency component of the edge portion may be the highest in a lower frequency region compared to the halftone dot region as a correction object. Therefore, in the above-described embodiment, the suitable edge extraction can be performed in such a way that the frequency region of the frequency component utilized in the specific high frequency component strength extraction section is set to be higher than the frequency region of the frequency component utilized in the edge extraction section.

The frequency component obtained by the frequency decomposition has a spatial periodicity. Further, since positive and negative values are spatially aligned alternatively, it is impossible to stably identify the region when this is adopted as the halftone dot coefficient. Therefore, the components are averaged within a certain region by calculating a root mean square in the horizontal and vertical directions, whereby the stable halftone dot coefficient is obtained.

The strength of the frequency component obtained by the frequency decomposition is proportional to the amplitude of the frequency. Therefore, when the value of this frequency component from which the edge component is subtracted is used as the halftone coefficient, the correction effect depends on the amplitude of the halftone dot. Therefore, in the embodiment of the present invention, normalization is performed with respect to the frequency component, whereby the correction is most effectively performed, regardless of the amplitude of the frequency. In addition, the strongest one of a plurality of frequency components is used for the normalization, and the halftone dot coefficient is at its maximum only in the halftone dot region having the line number suitable for correction, thus only the halftone dot region having the line number suitable for correction is appropriately corrected.

Since the frequency component of an object of process also contains the frequency component of the halftone dot region as a correction object, it is necessary to separate the edge region from the halftone dot region. In the above-described embodiment, by independently processing the horizontal component and the vertical component and calculating the average value of a certain region, it is possible to cancel a halftone dot component and to extract only an edge component.

According to the embodiment of this invention, moire in the halftone dot region, which is generated when the missing pixel is subjected to interpolation processing using only weighting interpolation, is corrected with the correction value depending on the degree of the neighbor region as a halftone dot region. Thus, it is possible to decrease moire in the halftone dot region. Further, more desirable correction is possible because the correction is performed depending on the degree of being in a halftone dot region. It is possible to perform the correction only in the halftone dot region and to avoid the correction in the non-halftone dot region.

According to the embodiment of this invention, the primarily interpolated image signal is generated by weighting interpolation processing suitable for the high frequency region while the second primarily interpolated image signal is generated by weighting interpolation processing suitable for the low frequency region. This primarily interpolated image signal is subjected to frequency decomposition to be utilized for judgment of the halftone dot region (calculation of the halftone dot degree) and calculation of the correction value. As a final interpolated pixel value, is output the value obtained by synthesizing the following two values at a ration depending on the halftone dot degree: the interpolation value in the second primary interpolation image signal; and a value obtained by correcting the correction value in the primarily interpolated image signal using the correction value. In this manner, in the embodiment of the present invention, since the primarily interpolated image signal obtained by the weighting interpolation processing which is suitable for the high frequency region hence suitable for the halftone dot region is used to calculate the correction value, less correction is needed compared to the case where the second primarily interpolated image signal obtained by using the weighting interpolation processing which is suitable for the low frequency region hence suitable for non halftone dot region. To put it in other words, in the halftone dot region the weighting interpolation processing more suitable for the halftone dot region is performed in the halftone dot region, whereby a more appropriately corrected pixel value is obtained with less correction. In the non-halftone region, the interpolation processing suitable for the non-halftone dot region is performed in the non-halftone dot region, whereby an image with an excellent quality is obtained.

What is claimed is:

1. A pixel interpolation apparatus, comprising:
   a weighting interpolation section configured to calculate a pixel value for a missing pixel in an input image signal having the missing pixel by using, as reference pixels, pixels located in a neighborhood of the missing pixel, and configured to generate a primarily interpolated image signal in which a pixel having the pixel value is inserted at a position of the missing pixel in the input image;
   a frequency decomposition section configured to decompose the primarily interpolated image signal generated by the weighting interpolation section into frequency components of a plurality of frequency regions;
   a halftone dot degree calculation section configured to calculate a halftone dot degree indicating a degree how a vicinity of the missing dot is located in a halftone dot region, by using a high frequency component of the frequency components obtained by the frequency decomposition section;

a correction value calculation section configured to calculate a correction value for the pixel value, by using a low frequency component of the frequency components; and a correction section configured to output, as a result of interpolation, a signal in which the correction value is added to the pixel value for the missing pixel in the primarily interpolated image signal in accordance with the halftone dot degree, wherein the correction value calculation section calculates the correction value based on a difference between a low frequency component, for the missing pixel, of the frequency components obtained by decomposing the primarily interpolated image signal in the frequency decomposition section, and a low frequency component, for the reference pixels in the neighborhood of the missing pixel, of the frequency components.

2. An image reading apparatus, comprising:

a reading section which includes a line sensor having a plurality of sensor chips, each of which has a reading region made up of a plurality of pixels arranged in a predetermined direction, arranged in series in the predetermined direction with a missing pixel generated between the adjoining sensor chips, and is configured to optically read in two dimensions a document while conveying the line image sensor and the document relatively to each other; and the pixel interpolation apparatus of claim 1, the pixel interpolation apparatus interpolating a missing pixel of an image obtained by reading a document by the reading section.

3. A method for interpolating a pixel, the method comprising the steps of:

generating, by using a weighting interpolation section, a primarily interpolated image signal of an input image having a missing pixel, by obtaining a pixel value for the missing pixel by using, as reference pixels, pixels located in a neighborhood of the missing pixel, and then inserting a pixel having the pixel value at a position of the missing pixel in the input image signal;

decomposing, by using a frequency decomposition section, the primarily interpolated image signal into frequency components of a plurality of frequency regions;

obtaining, by using a halftone dot degree calculation section, a halftone dot degree by using a high frequency component of the frequency components obtained in the step of decomposing, the halftone dot degree indicating a degree how a vicinity of the missing pixel is located in a halftone dot region;

calculating, by using a correction value calculation section, a correction value for the pixel value, based on a difference between a low frequency component, for the missing pixel, of the frequency components obtained by decomposing the primarily interpolated image signal in the frequency decomposition section, and a low frequency component, for the reference pixels in the neighborhood of the missing pixel, of the frequency components; and outputting, as an interpolation result by using a correction section, a signal obtained by adding, in accordance with the halftone dot degree, the correction value to the pixel value for the missing pixel in the primarily interpolated image signal.

4. A pixel interpolation apparatus comprising:

a weighting interpolation section configured to calculate a pixel value for a missing pixel in an input image signal having the missing pixel by using, as reference pixels, pixels located in a neighborhood of the missing pixel, and configured to generate a primarily interpolated image signal in which a pixel having the pixel value is inserted at a position of the missing pixel in the input image;

a frequency decomposition section configured to decompose the primarily interpolated image signal generated by the weighting interpolation section into frequency components of a plurality of frequency regions;

a halftone dot degree calculation section configured to calculate a halftone dot degree indicating a degree how a vicinity of the missing dot is located in a halftone dot region, by using a high frequency component of the frequency components obtained by the frequency decomposition section;

a correction value calculation section configured to calculate a correction value for the pixel value, by using a low frequency component of the frequency components; and a correction section configured to output, as a result of interpolation, a signal in which the correction value is added to the pixel value for the missing pixel in the primarily interpolated image signal in accordance with the halftone dot degree, wherein the correction value calculation section calculates the correction value for each of low frequency components which are of the frequency components output from the frequency decomposition section and which include the lowest frequency component and have different frequency region from each other, and wherein the correction value calculation section selects a correction value, from the thus calculated correction values, depending on a frequency component in a vicinity of the missing pixel, and outputs the selected correction value as a correction value for the missing pixel.

5. A method for interpolating a pixel, the method comprising the steps of:

generating, by using a weighting interpolation section, a primarily interpolated image signal of an input image having a missing pixel, by obtaining a pixel value for the missing pixel by using, as reference pixels, pixels located in a neighborhood of the missing pixel, and then inserting a pixel having the pixel value at a position of the missing pixel in the input image signal;

decomposing, by using a frequency decomposition section, the primarily interpolated image signal into frequency components of a plurality of frequency regions;

obtaining, by using a halftone dot degree calculation section, a halftone dot degree by using a high frequency component of the frequency components obtained in the step of decomposing, the halftone dot degree indicating a degree how a vicinity of the missing pixel is located in a halftone dot region;

calculating, by using a correction value calculation section, correction values for respective low frequency components which are of the frequency components output from the frequency decomposition section and which include the lowest frequency component and have different frequency region from each other; then selecting one correction value out of the correction values, depending on a frequency component in a vicinity of the missing pixel; and outputting the selected correction value as the correction value; and outputting, as an interpolation result by using a correction section, a signal obtained by adding, in accordance with the halftone dot degree, the correction value to the pixel value for the missing pixel in the primarily interpolated image signal.

6. A pixel interpolation apparatus comprising:
a weighting interpolation section configured to calculate a pixel value for a missing pixel in an input image signal having the missing pixel by using, as reference pixels, pixels located in a neighborhood of the missing pixel, and configured to generate a primarily interpolated image signal in which a pixel having the pixel value is inserted at a position of the missing pixel in the input image;
a frequency decomposition section configured to decompose the primarily interpolated image signal generated by the weighting interpolation section into frequency components of a plurality of frequency regions;
a halftone dot degree calculation section configured to calculate a halftone dot degree indicating a degree how a vicinity of the missing dot is located in a halftone dot region, by using a high frequency component of the frequency components obtained by the frequency decomposition section;
a correction value calculation section configured to calculate a correction value for the pixel value, by using a low frequency component of the frequency components; and
a correction section configured to output, as a result of interpolation, a signal in which the correction value is added to the pixel value for the missing pixel in the primarily interpolated image signal in accordance with the halftone dot degree,
wherein the halftone dot degree calculation section includes:
a halftone dot extraction section configured to calculate a halftone dot coefficient for each of the plurality of reference pixels in the neighborhood of the missing pixel by using the high frequency component, wherein the halftone dot coefficient indicates a degree how the each of the plurality of reference pixels is located in the halftone dot region; and
a halftone dot coefficient selection section configured to output, as the halftone dot degree, a minimum value of the plurality of halftone dot coefficients calculated in the halftone dot extraction section.

7. The pixel interpolation apparatus of claim 6, wherein the halftone dot extraction section includes:
a specific high frequency component extraction section configured to calculate, as specific high frequency strengths, strengths of frequency components which are of the frequency components output from the frequency decomposition section and do not include the lowest frequency component;
an edge extraction section configured to calculates an edge extraction value indicating a degree how the reference pixels are located in an edge region by using a frequency component which are of the frequency components and do not include the lowest frequency component; and
a halftone dot coefficient calculation section configured to output, as the halftone dot coefficients, results obtained by subtracting the edge extraction value from the specific high frequency strengths.

8. The pixel interpolation apparatus of claim 7, wherein the frequency components used in the specific high frequency component extraction section have frequency regions higher than frequency regions of the frequency components used in the edge extraction section.

9. The pixel interpolation apparatus of claim 7, wherein the input image is made up of pixels arranged in a matrix, and the specific high frequency component extraction section calculates root mean squares, in a row direction and a column direction of the matrix, of the frequency components which are of the frequency components output from the frequency decomposition section and do not include the lowest frequency component, then averages the root mean squares in a region having a predetermined area to obtain an average value as the specific frequency strength.

10. The pixel interpolation apparatus of claim 7, wherein the halftone dot coefficient calculation section includes:
an edge subtraction section configured to obtain a value by subtracting the edge extraction value from the specific frequency strength and to output the obtained value as a pre-normalization halftone dot coefficient;
a normalization selection section configured to calculate strengths of the frequency components which are of the frequency components output from the frequency decomposition section and do not include the lowest frequency component, and configured to select, as a representative value, a maximum value from the thus obtained strengths; and
a normalization section configured to obtain a value by normalizing the pre-normalization halftone dot coefficient by the representative value, and to output the thus obtained value as the halftone dot coefficient.

11. The pixel interpolation apparatus of claim 7, wherein the input image is made up of pixels arranged in a matrix, and the halftone dot coefficient calculation section includes:
an edge subtraction section configured to obtain values by subtracting the edge extraction value from the specific frequency strengths, and to output the thus obtained values as pre-normalization halftone dot coefficients;
a normalization selection section configured to calculate root mean squares, in a row direction and a column direction of the matrix, of each of the frequency components which are of the frequency components output from the frequency decomposition section and do not include the lowest frequency component, then average the root mean squares, in a region having a predetermined area to obtain average values for respective frequency components, and output a maximum value of the thus obtained average values as a representative value; and
a normalization section configured to obtain values by normalizing the pre-normalization halftone dot coefficients by the representative value, and to output the thus obtained values as the halftone dot coefficients.

12. The pixel interpolation apparatus of claim 7, wherein the input image is made of pixels arranged in a matrix, and the edge extraction section averages the frequency components which are of the frequency components output from the frequency decomposition section and do not include the lowest frequency component, in each of a row direction and a column direction of the matrix in a region having a predetermined size, thereby obtaining averaged results, and then calculates a root mean square of the averages results to output the root mean square as the edge extraction value.

13. A method for interpolating a pixel, the method comprising the steps of:
generating, by using a weighting interpolation section, a primarily interpolated image signal of an input image having a missing pixel, by obtaining a pixel value for the missing pixel by using, as reference pixels, pixels located in a neighborhood of the missing pixel, and then inserting a pixel having the pixel value at a position of the missing pixel in the input image signal;
decomposing, by using a frequency decomposition section, the primarily interpolated image signal into frequency components of a plurality of frequency regions;

obtaining, by using a halftone dot degree calculation section, a halftone dot degree by using a high frequency component of the frequency components obtained in the step of decomposing, the halftone dot degree indicating a degree how a vicinity of the missing pixel is located in a halftone dot region; and calculating, by using a correction value calculation section, a correction value for the pixel value, by using a low frequency component of the frequency components; and outputting, as an interpolation result by using a correction section, a signal obtained by adding, in accordance with the halftone dot degree, the correction value to the pixel value for the missing pixel in the primarily interpolated image signal, wherein the step of obtaining a halftone dot degree comprises steps of:

calculating, by using a halftone dot extraction section, a halftone dot coefficient for each of the plurality of reference pixels in the neighborhood of the missing pixel by using the high frequency component, wherein the halftone dot coefficient indicates a degree how the each of the plurality of reference pixels is located in the halftone dot region; and outputting, as the halftone dot degree by using a halftone dot coefficient selection section, a minimum value of the plurality of halftone dot coefficients calculated in the halftone dot extraction section.

14. A pixel interpolation apparatus, comprising:

a weighting interpolation section configured to calculate, by a first interpolation method, a pixel value for a missing pixel in an input image having the missing pixel by using, as reference pixels, pixels located in a neighborhood of the missing pixel, and configured to generate a primarily interpolated image signal in which a pixel having the pixel value is inserted at a position of the missing pixel in the input image;

a second weighting interpolation section configured to calculate, by a second weighting interpolation method, a second pixel value for the missing pixel by using, as reference pixels, pixels located in a neighborhood of the missing pixel, and configured to generate a second primarily interpolated image signal in which a pixel having the second pixel value is inserted at the position of the missing pixel in the image signal, wherein the second weighting interpolation method uses a smaller reference area of the reference pixels than the first interpolation method;

a frequency decomposition section configured to decompose the primarily interpolated image signal generated by the weighting interpolation section into frequency components of a plurality of frequency regions;

a halftone dot degree calculation section configured to calculate a halftone dot degree indicating a degree how a vicinity of the missing dot is located in a halftone dot region, by using a high frequency component of the frequency components obtained by the frequency decomposition section;

a correction value calculation section configured to calculate a correction value for the pixel value, by using a low frequency component of the frequency components; and a correction section configured to output, as a result of interpolation, a signal in which a part, corresponding to the missing pixel, of the second primarily interpolated image signal has been replaced with a value made by combining, in accordance with the half tone degree, a value made by adding the correction value to the pixel value and the second pixel value.

15. The pixel interpolation apparatus of claim 14, wherein the correction value calculation section calculates the correction value based on a difference between a low frequency component, for the missing pixel, of the frequency components obtained by decomposing the primarily interpolated image signal in the frequency decomposition section, and a low frequency component, for the reference pixels in the neighborhood of the missing pixel, of the frequency components.

16. The pixel interpolation apparatus of claim 14, wherein the correction value calculation section calculates the correction value for each of low frequency components which are of the frequency components output from the frequency decomposition section and which include the lowest frequency component and have different frequency region from each other, and wherein the correction value calculation section selects a correction value, from the thus calculated correction values, depending on a frequency component in a vicinity of the missing pixel, and outputs the selected correction value as a correction value for the missing pixel.

17. The pixel interpolation apparatus of claim 14, wherein the halftone dot degree calculation section includes:

a halftone dot extraction section configured to calculate a halftone dot coefficient for each of the plurality of reference pixels in the neighborhood of the missing pixel by using the high frequency component, wherein the halftone dot coefficient indicates a degree how the each of the plurality of reference pixels is located in the halftone dot region; and a halftone dot coefficient selection section configured to output, as the halftone dot degree, a minimum value of the plurality of halftone dot coefficients calculated in the halftone dot extraction section.

18. An image reading apparatus, comprising:

a reading section which includes a line sensor having a plurality of sensor chips, each of which has a reading region made up of a plurality of pixels arranged in a predetermined direction, arranged in series in the predetermined direction with a missing pixel generated between the adjoining sensor chips, and is configured to optically read in two dimensions a document while conveying the line image sensor and the document relatively to each other; and the pixel interpolation apparatus of claim 14, the pixel interpolation apparatus interpolating a missing pixel of an image obtained by reading a document by the reading section.

19. A method for interpolating a pixel, the method comprising the steps of:

generating, by using a weighting interpolation section, a first primarily interpolated image signal of an input image having a missing pixel, by obtaining a pixel value for the missing pixel by a first interpolation method by using, as reference pixels, pixels located in a neighborhood of the missing pixel, and then by inserting a pixel having the pixel value at a position of the missing pixel in the image signal;

generating, by using a second weighting interpolation section, a second primarily interpolated image signal, by obtaining a second pixel value by a second interpolation method and by using, as reference pixels, pixels located in a neighborhood of the missing pixel, and then by inserting a pixel having the second pixel value at the position of the missing pixel in the image signal, wherein the second interpolation method uses a smaller region of the reference pixels than the first interpolation method;

decomposing, by using a frequency decomposition section, the primarily interpolated image signal into frequency components of a plurality of frequency regions;

obtaining, by using a halftone dot degree calculation section, a halftone dot degree by using a high frequency component of the frequency components, the halftone dot degree indicating a degree how a vicinity of the missing pixel is located in a halftone dot region;

calculating, by using a correction value calculation section, a correction value for the pixel value by using a low frequency component of the frequency components; and outputting, as a result of interpolation by using a correction section, a signal in which a part, corresponding to the missing pixel, of the second primarily interpolated image signal, has been replaced with a value made by combining, in accordance with the half tone degree, a value made by adding the correction value to the pixel value and the second pixel value.

* * * * *